(12) United States Patent
Hirabayashi et al.

(10) Patent No.: US 12,057,756 B2
(45) Date of Patent: Aug. 6, 2024

(54) ROTATING DEVICE

(71) Applicant: MINEBEA MITSUMI Inc., Nagano (JP)

(72) Inventors: Koichiro Hirabayashi, Kitasaku-gun (JP); Yukimasa Matsumura, Kitasaku-gun (JP); Seiya Fujimoto, Kitasaku-gun (JP)

(73) Assignee: MINEBEA MITSUMI Inc., Nagano (JP)

( * ) Notice: Subject to any disclaimer, the term of this patent is extended or adjusted under 35 U.S.C. 154(b) by 464 days.

(21) Appl. No.: 17/415,009

(22) PCT Filed: Dec. 2, 2019

(86) PCT No.: PCT/JP2019/047090
§ 371 (c)(1),
(2) Date: Jun. 17, 2021

(87) PCT Pub. No.: WO2020/129597
PCT Pub. Date: Jun. 25, 2020

(65) Prior Publication Data
US 2022/0103043 A1    Mar. 31, 2022

(30) Foreign Application Priority Data

Dec. 17, 2018  (JP) ................. 2018-235597

(51) Int. Cl.
*H02K 5/24*        (2006.01)
*H02K 7/08*        (2006.01)
*H02K 7/116*       (2006.01)

(52) U.S. Cl.
CPC ............ *H02K 5/24* (2013.01); *H02K 7/083* (2013.01); *H02K 7/1166* (2013.01)

(58) Field of Classification Search
CPC ......... H02K 5/24; H02K 7/083; H02K 7/1166
(Continued)

(56) References Cited

U.S. PATENT DOCUMENTS 5,798,887 A    8/1998  Yoshida et al.
5,877,574 A *  3/1999  Molnar .................... H02K 3/50
                                                    310/156.05

(Continued)

FOREIGN PATENT DOCUMENTS

CN     1599680 A       3/2005
JP     S51-101280 U    8/1976
(Continued)

OTHER PUBLICATIONS

International Search Report for corresponding International Application No. PCT/JP2019/047090 mailed Feb. 18, 2020.
(Continued)

*Primary Examiner* — Terrance L Kenerly
(74) *Attorney, Agent, or Firm* — Pearne & Gordon LLP

(57) ABSTRACT

A rotating device according to an embodiment includes a motor, an output gear to transmit the rotation of the motor to the external device, and a housing accommodating the motor and the output gear. The motor is held by holding parts formed at the housing via an adhesive having elasticity. The adhesive having elasticity is disposed between surfaces perpendicular to an axial direction in the holding parts of the housing, and a first end part and a second end part-of a frame.

15 Claims, 29 Drawing Sheets

(58) Field of Classification Search
USPC .............................................. 310/89, 91, 51
See application file for complete search history.

(56) References Cited

U.S. PATENT DOCUMENTS

| | | | |
|---|---|---|---|
| 7,077,235 | B2 | 7/2006 | Eda et al. |
| 7,078,835 | B2 * | 7/2006 | Gross .................... F04D 29/668 |
| | | | 310/91 |
| 7,188,700 | B2 | 3/2007 | Eda et al. |
| 2004/0012289 | A1 | 1/2004 | Gross et al. |
| 2004/0245040 | A1 | 12/2004 | Eda et al. |
| 2006/0191738 | A1 | 8/2006 | Eda et al. |
| 2018/0342912 | A1 | 11/2018 | Horii et al. |
| 2020/0036257 | A1 | 1/2020 | Kawamuro et al. |

FOREIGN PATENT DOCUMENTS

| | | | |
|---|---|---|---|
| JP | 55-000162 | Y2 | 1/1980 |
| JP | S55-1162 | U | 1/1980 |
| JP | S60-82945 | U | 6/1985 |
| JP | 08-007802 | Y | 1/1991 |
| JP | 08-007802 | Y2 | 1/1991 |
| JP | H06-189498 | A | 7/1994 |
| JP | 08-103050 | A | 4/1996 |
| JP | H09-215261 | A | 8/1997 |
| JP | H10-322967 | A | 12/1998 |
| JP | 2004-153914 | A | 5/2004 |
| JP | 2006-014460 | A | 1/2006 |
| WO | 2018/199023 | A1 | 1/2018 |

OTHER PUBLICATIONS

Written Opinion for corresponding International Application No. PCT/JP2019/047090 dated Feb. 18, 2020.
Notice of Reasons for Refusal dated Jan. 31, 2023 for corresponding Japanese Application No. 2020-561264 and English translation.
Notice of Reasons for Refusal dated Jul. 26, 2022 for corresponding Japanese Application No. 2020-561264 and English translation.
English translation of the Written Opinion for corresponding International Application No. PCT/JP2019/047090 mailed Feb. 18, 2020.
First Office Action dated Apr. 11, 2024 for corresponding Chinese Application No. 201980083354.8 and English translation.

* cited by examiner

ROTATING DEVICE

FIELD

The present invention relates to a rotating device.

BACKGROUND

Conventionally, there has been known a rotating device comprising a motor, a gear for transmitting the rotation of the motor to the external device, a housing for accommodating the motor and the gear, and a support part for supporting the bearing part of the motor. Some of such rotating devices include an O-ring made of an elastic member such as rubber for absorbing vibration (see Patent Literature 1).

CITATION LIST

Patent Literature

Patent Literature 1: Japanese Patent Application Laid-open No. H9-215261

SUMMARY

Technical Problem

However, using the O-ring as disclosed in Patent Literature 1 described above increases the cost. Moreover, because the O-ring has a predetermined thickness, a certain amount of space is required between the housing and the motor. The reaction force of the gear on the rotating shaft of the motor may deform the O-ring, the movement of the motor may change the gear engagement, and abnormal noise may be generated.

The present invention takes the above problem as an example, and an object of the present invention is to provide a rotating device capable of suppressing the generation of abnormal noise.

Solution to Problem

In order to achieve the above object, the present invention is grasped by the following constitution. A rotating device according to the present invention comprises a housing including a motor, a gear, and a housing accommodating the motor and the gear. The motor is held by a holding part formed in the housing via a resin member having elasticity.

DESCRIPTION OF EMBODIMENTS

Figure 1:
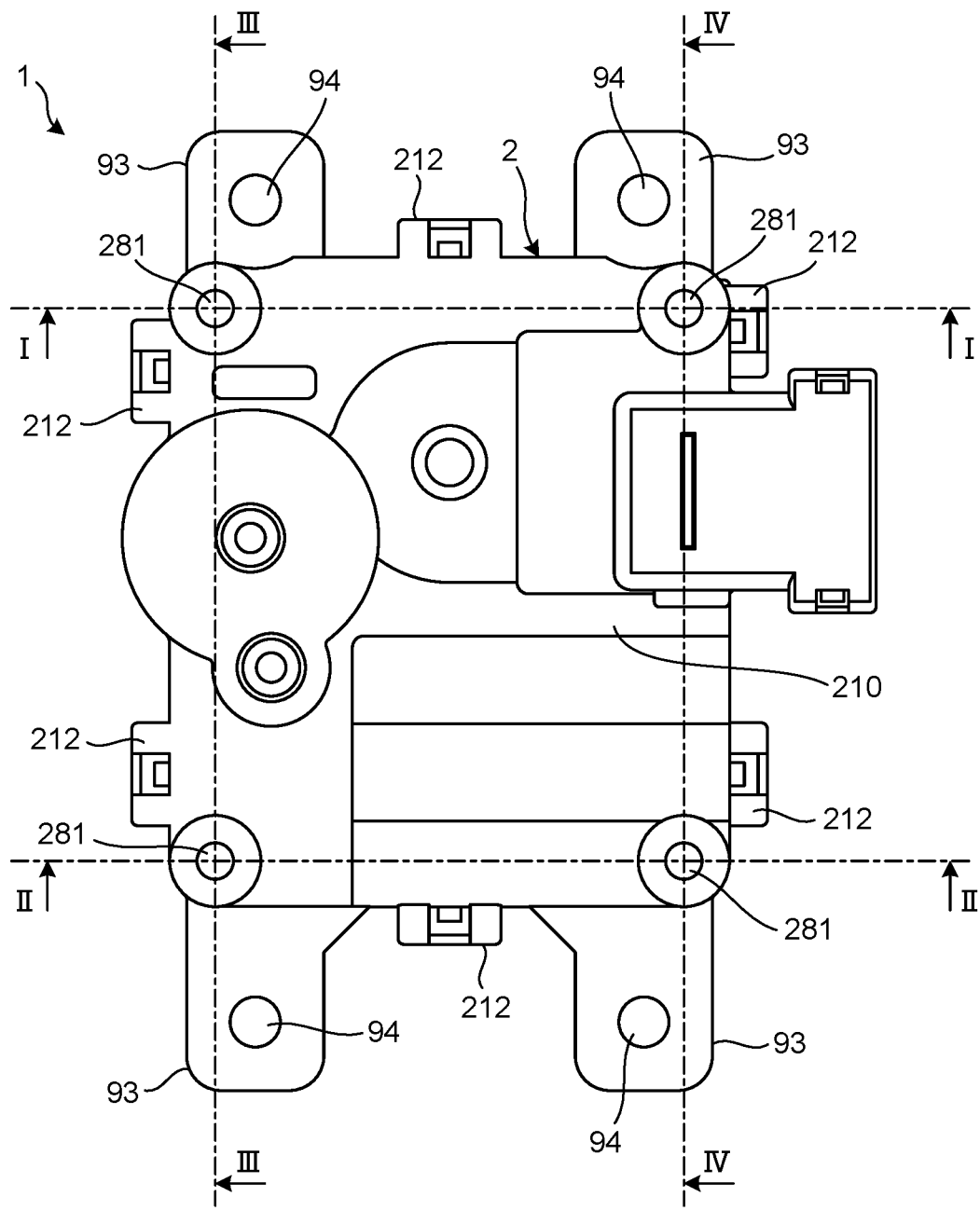
FIG. 1 is a plan view of a rotating device according to an embodiment.

Hereinafter, a mode for carrying out the present invention (hereinafter, referred to as an "embodiment") will be described in detail with reference to the accompanying drawings. The same reference numerals denote the same components throughout the entire description of the embodiment.

Figure 2:
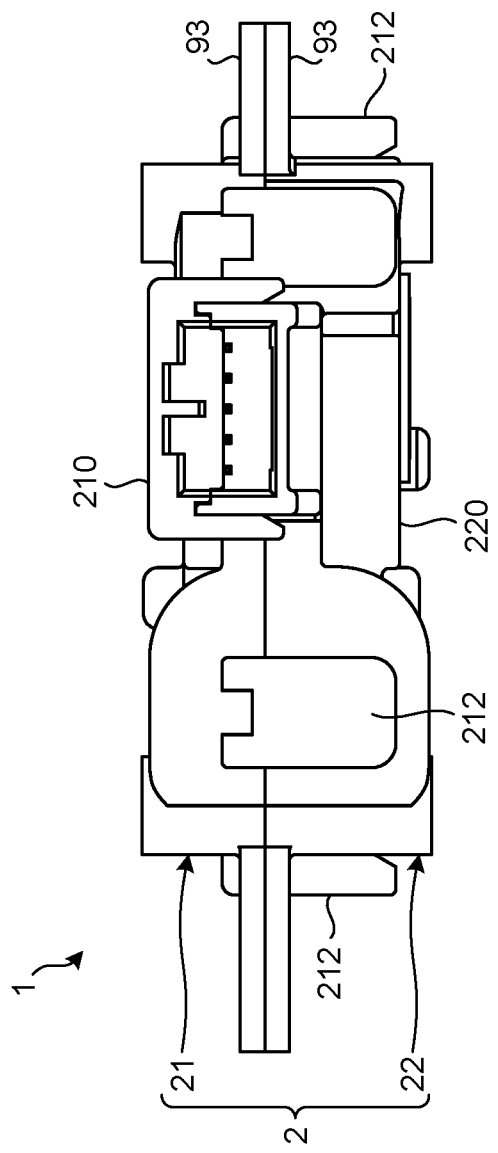
FIG. 2 is a side view of the rotating device according to the embodiment.
Figure 3:
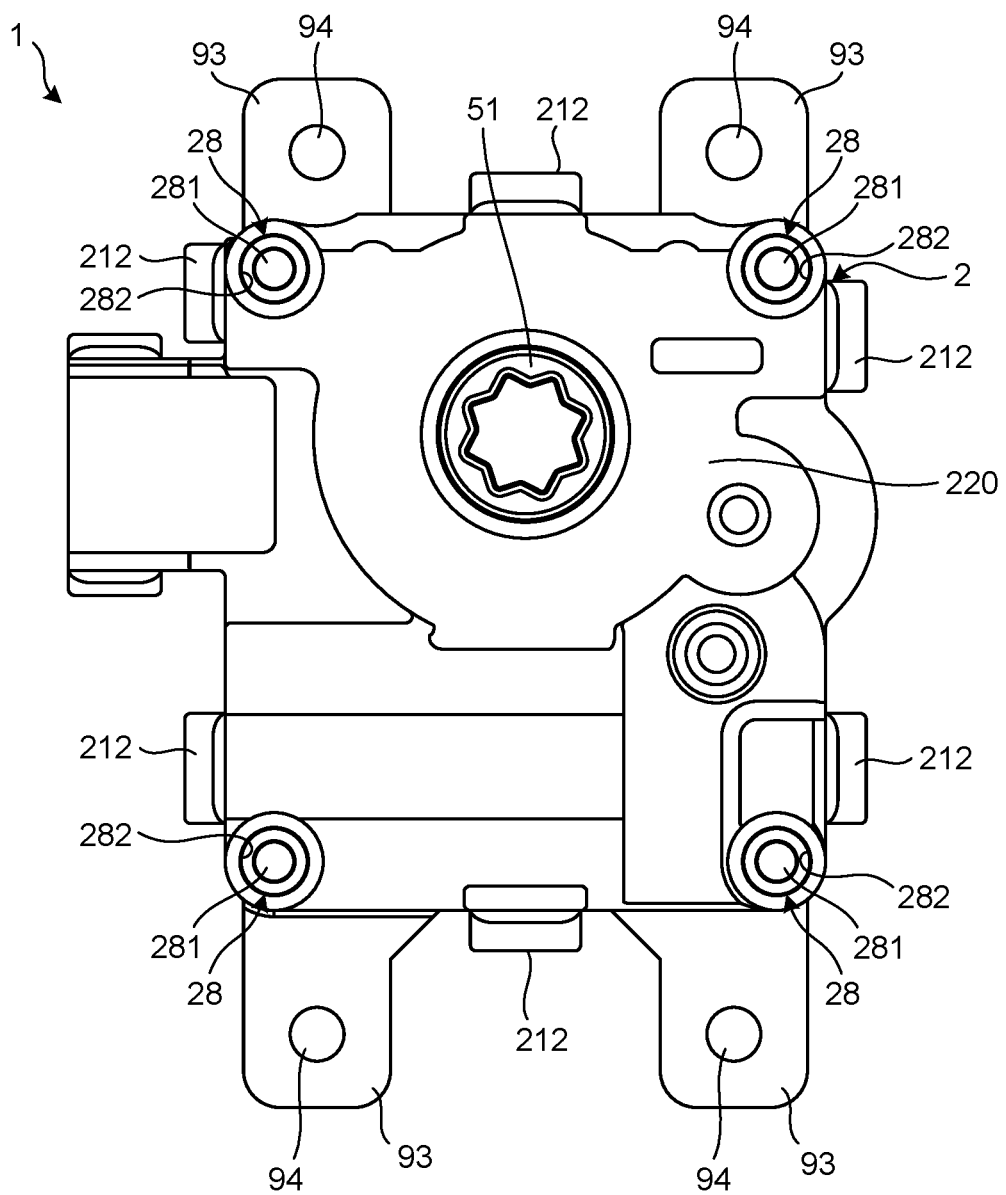
FIG. 3 is a bottom view of the rotating device according to the embodiment.
Figure 4A:
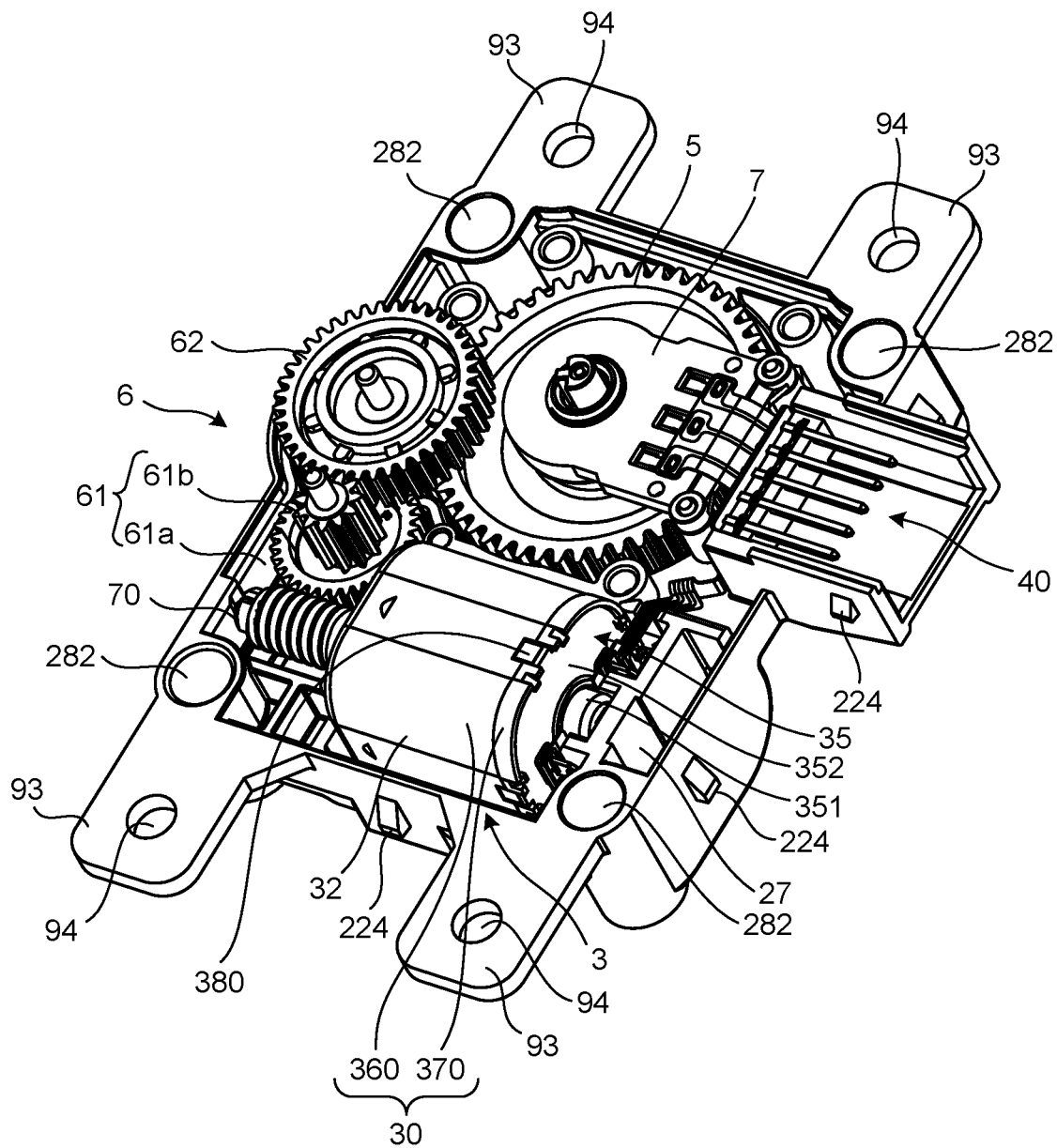
FIG. 4A is a perspective view of a first housing removed from the rotating device according to the embodiment.
Figure 4B:
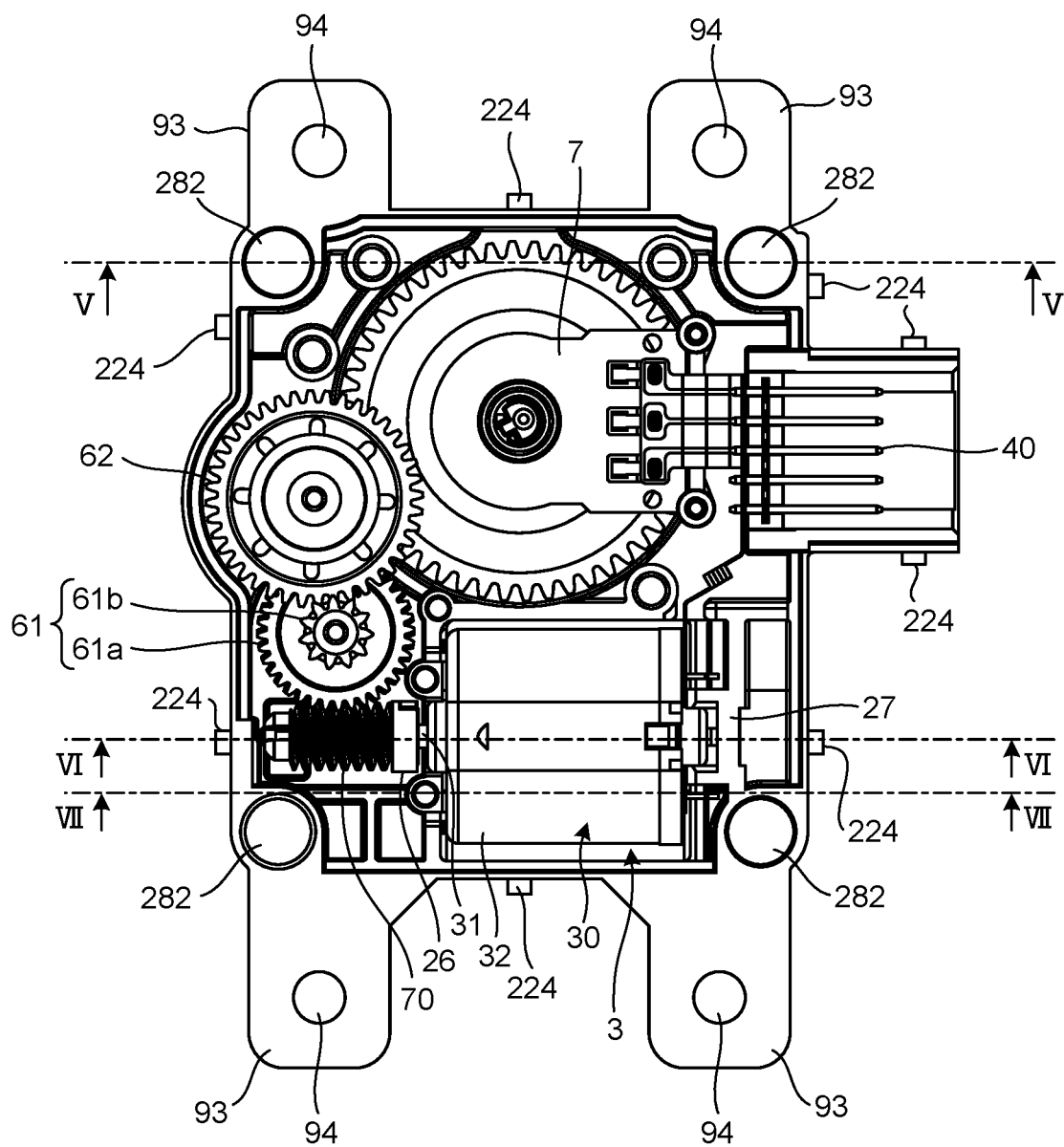
FIG. 4B is a plan view of the first housing removed from the rotating device according to the embodiment.
Figure 4C:
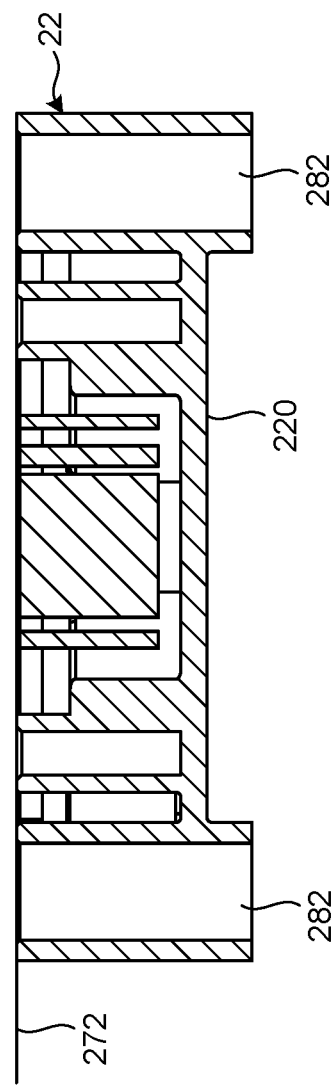
FIG. 4C is a sectional view cut along the line V-V in FIG. 4B.
Figure 4D:
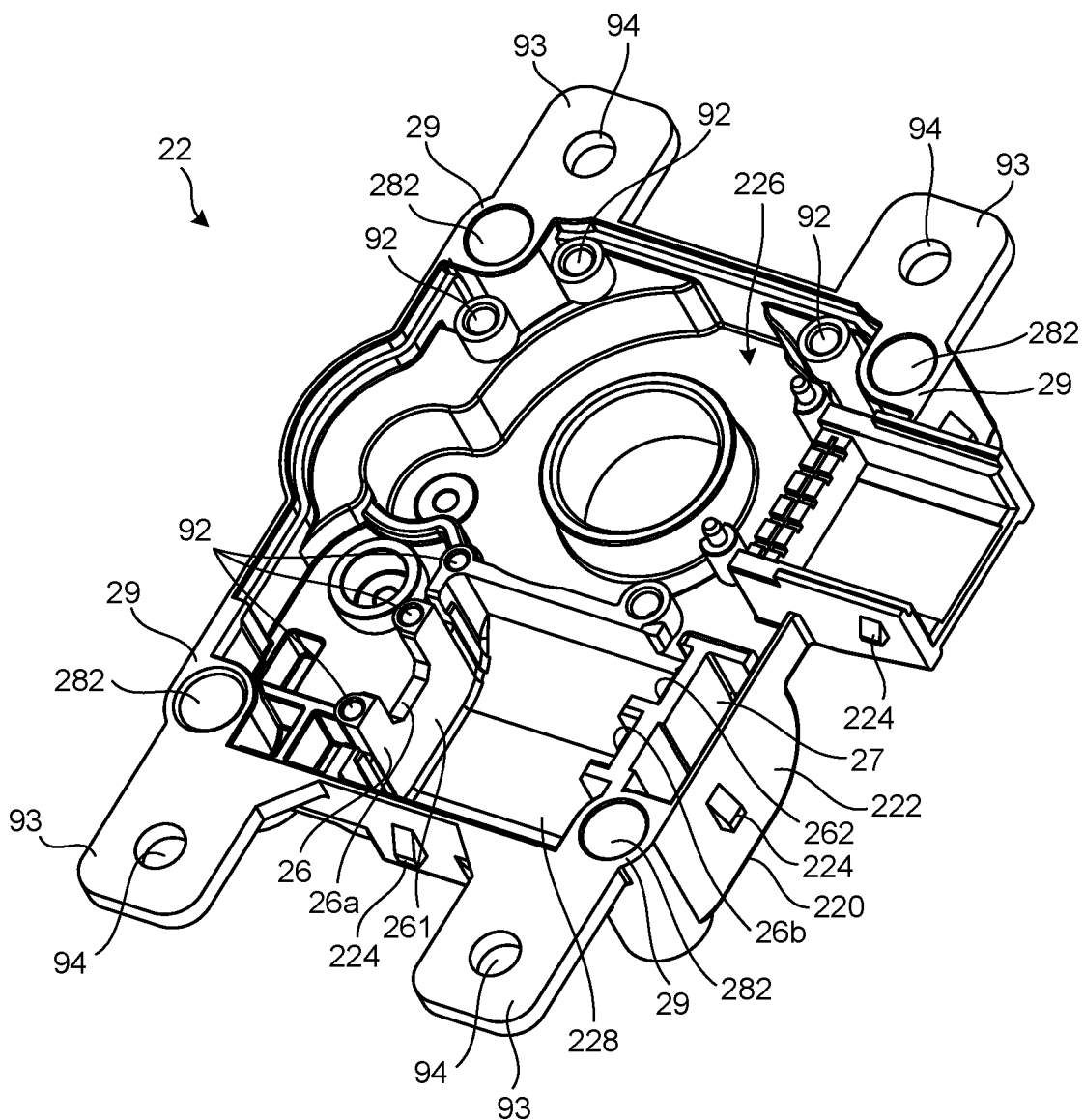
FIG. 4D is a perspective view of a second housing of the rotating device according to the embodiment.
Figure 5:
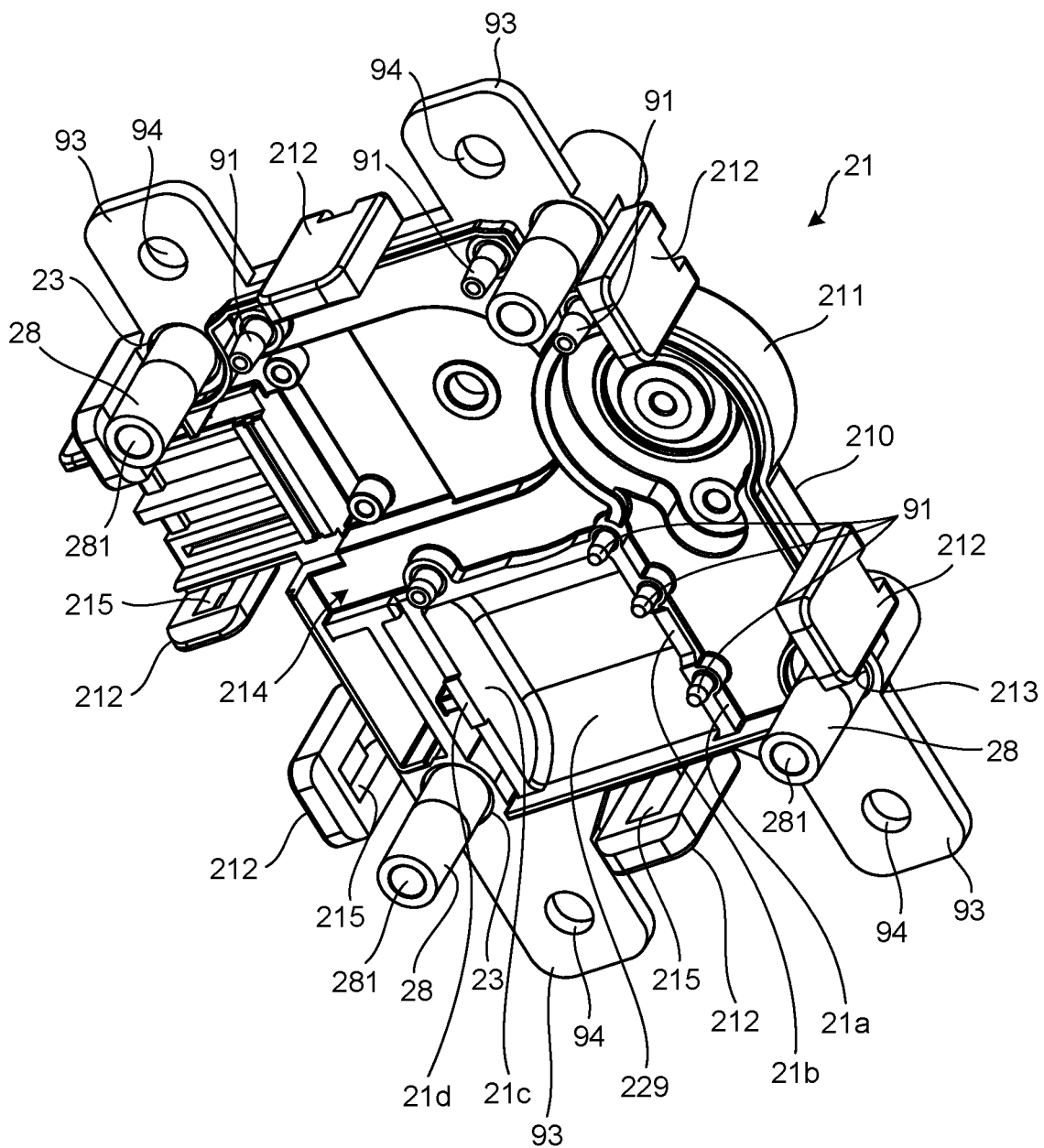
FIG. 5 is a perspective view of the first housing of the rotating device according to the embodiment.

FIG. 1 is a plan view of a rotating device according to an embodiment. FIG. 2 is a side view of the rotating device according to the embodiment. FIG. 3 is a bottom view of the rotating device according to the embodiment. FIG. 4A is a perspective view of a first housing removed from the rotating device according to the embodiment. FIG. 4B is a plan view of the first housing removed from the rotating device according to the embodiment. FIG. 4C is a sectional view cut along the line V-V in FIG. 4B. FIG. 4D is a perspective view of a second housing of the rotating device according to the embodiment. Moreover, FIG. 5 is a perspective view of the first housing of the rotating device according to the embodiment.

For example, a rotating device 1 according to the embodiment can be suitably used as an actuator used in air conditioning systems for vehicles, and can control the rotational movement of louvers for controlling the air volume and the like.

As illustrated in FIG. 1 to FIG. 3, the rotating device 1 includes a housing 2 accommodating a power transmission mechanism unit. Specifically, in this example, the power transmission mechanism unit is configured by a motor 3 illustrated in FIG. 4A and FIG. 4B, a plurality of gears (hereinafter, referred to as a gear group) 6 for transmitting power from the motor 3, a sensor 7 for detecting the rotation angle of an output gear 5 included in the gear group 6, and the like. The sensor 7 may also detect the rotation frequency of the output gear 5 instead of the rotation angle, or may detect both the rotation angle and the rotation frequency.

The gear group 6 of the power transmission mechanism unit includes a worm gear 70 installed on a rotating shaft 31 (see FIG. 12) of the motor 3, a first transmission gear 61, a second transmission gear 62, and the output gear 5. That is, as illustrated in FIG. 4A, the rotation of the worm gear 70 is transmitted to a helical gear 61a of the first transmission gear 61, and is transmitted to the second transmission gear 62 via a small-diameter gear 61b provided at the same shaft as the helical gear 61a, and having a relatively smaller diameter than the helical gear 61a. The rotation of the second transmission gear 62 is transmitted to the output gear 5. Moreover, an output shaft 51 (FIG. 3) is coupled to the output gear 5, and the rotating shafts of the first transmission gear 61 and the second transmission gear 62 are oriented in a direction of the output shaft 51, and are in a direction intersecting the rotating shaft of the worm gear 70.

Consequently, the rotation of the motor 3 is reduced at a predetermined reduction ratio, and can be output to the external device through the output shaft 51. The rotation angle of the output gear 5 is then detected by the sensor 7.

Information on the rotation angle of the output gear 5 detected by the sensor 7 is transmitted to the external device via a terminal group 40 illustrated in FIG. 4A and FIG. 4B.

In the present embodiment, a DC motor is used as the motor 3. However, a brushless motor and a stepping motor may also be used. When the brushless motor or the stepping motor is used, the rotating device 1 may not require the sensor 7.

As illustrated in FIG. 2, the housing 2 includes a first housing 21 and a second housing 22 opposing each other. That is, the housing 2 is formed by connecting the first housing 21 (FIG. 5) having an opening part 214 and the second housing 22 (FIG. 4D) having an opening part 226, in a state while the opening parts 214 and 226 are abutted to each other.

As illustrated in FIG. 5, the first housing 21 includes a first surface part 210 to be a top surface part of the housing 2, and a first side wall part 211 provided at the outer peripheral part of the first surface part 210. The opening part 214 is surrounded by the first side wall part 211. Alternatively, as illustrated in FIG. 3 and FIG. 4D, the second housing 22 includes a second surface part 220 to be a bottom surface part of the housing 2, and a second side wall part 222 provided at the outer peripheral part of the second surface part 220. The opening part 226 is surrounded by the second side wall part 222. The housing 2 is formed of a resin material such as polypropylene, polyethylene terephthalate, and acrylonitrile butadiene styrene (ABS).

Moreover, as illustrated in FIG. 5 and FIG. 4D, a first contact surface 271 and a second contact surface 272 coming into contact with each other, are formed at the corresponding peripheral part of the opening part 214 of the first housing 21 and the peripheral part of the opening part 226 of the second housing 22 (see FIG. 6 to FIG. 9).

Furthermore, as illustrated in FIG. 5, in the first housing 21, a plurality of engagement parts 212 extending toward the second housing 22 side are integrally formed at the outer peripheral part of the first side wall part 211. An engagement recessed part 215 is provided at each of the engagement parts 212. On the other hand, as illustrated in FIG. 4D, in the second housing 22, a plurality of projections (hereinafter, referred to as engagement projections) 224 corresponding to the engagement parts 212 of the first housing 21 are integrally formed at the second side wall part 222. Each of the engagement projections 224 engages with the engagement recessed part 215 in the engagement part 212.

Consequently, the housing 2 is formed by abutting the first housing 21 and the second housing 22 so that the first contact surface 271 and the second contact surface 272 come into contact with each other (see FIG. 2). That is, by engaging the engagement projection 224 of the second housing 22 with a hole part of the engagement part 212 of the first housing 21, the first housing 21 and the second housing 22 are integrated, and the housing 2 for accommodating the power transmission mechanism unit including the motor 3, the gear group 6, and the like described above is formed.

In the present embodiment, the engagement part 212 is provided in the first housing 21, and the engagement projection 224 is provided in the second housing 22. However, the engagement part 212 may be provided in the second housing 22, and the engagement projection 224 may be provided in the first housing 21.

As illustrated in FIG. 5, a plurality of projection parts 91 are provided in the first housing 21 for positioning. As illustrated in FIG. 4D, a plurality of fitting holes 92 each corresponding to each of the projection parts 91 in the first housing 21 are provided in the second housing 22. In a state when the first housing 21 and the second housing 22 are abutted to each other and integrally joined, the projection part 91 is fitted into each hole part (hereinafter, referred to as a fitting hole) 92.

Moreover, as illustrated in FIG. 5 and FIG. 4D, a piece (hereinafter, referred to as a joining piece) 93 protruding outward is formed at both end parts of one side of the first housing 21 and the second housing 22. A connection hole 94 for inserting a tightening tool (not illustrated) serving as a predetermined fixing member is provided at the joining piece 93. The joined first housing 21 and the second housing 22 are firmly connected by the predetermined tightening tool via the four connection holes 94, to form the integrated housing 2.

In the configuration of the housing 2 described above, in the present embodiment, a protrusion part 28 is provided at the corner of the first side wall part 211 forming the outer peripheral part of the first housing 21, and a second through hole 282 is provided at the corner of the second housing 22. That is, for example, in the first housing 21, a cylinder-shaped protrusion part 28 having a first through hole 281 for inserting a fastening tool 60 (see FIG. 10 and FIG. 11) such as a bolt and a screw, is formed so as to protrude from the first surface part 210. In the second housing 22, the second through hole 282 for fitting the protrusion part 28 is provided.

A plurality of the protrusion parts 28 are provided, and a plurality of the second through holes 282 are provided accordingly. Each of the plurality of the protrusion parts 28 is provided at each of a plurality (four) of corners of the first housing 21. Each of the plurality of the second through holes 282 is provided at each of a plurality (four) of corners of the second housing 22. In the present embodiment, the first surface part 210 of the first housing 21 and the second surface part 220 of the second housing 22 are formed in a substantially rectangular shape in a plan view, and the protrusion part 28 and the second through hole 282 are provided at each of the four corners.

As illustrated in FIG. 4D, in the second housing 22, regions corresponding to the four corners of the second side wall part 222 are formed thicker. The second through hole 282 extending from the second contact surface 272 to the second surface part 220 is formed at a thick part 29. The joining piece 93 is provided outside of each of the four corners of the second side wall part 222.

Figure 6:
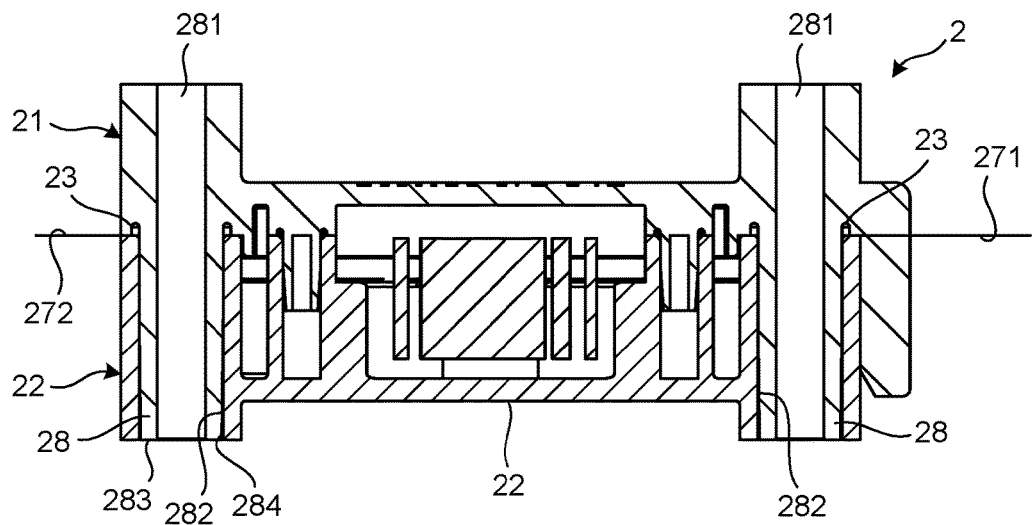
FIG. 6 is a sectional view cut along the line I-I in FIG. 1.

In this example, with reference to FIG. 6 to FIG. 11, a mode in which the protrusion part 28 formed at the first housing 21 is fitted into the second through hole 282 formed at the second housing 22 will be described. FIG. 6 is a sectional view cut along the line I-I in FIG. 1.

Figure 7:
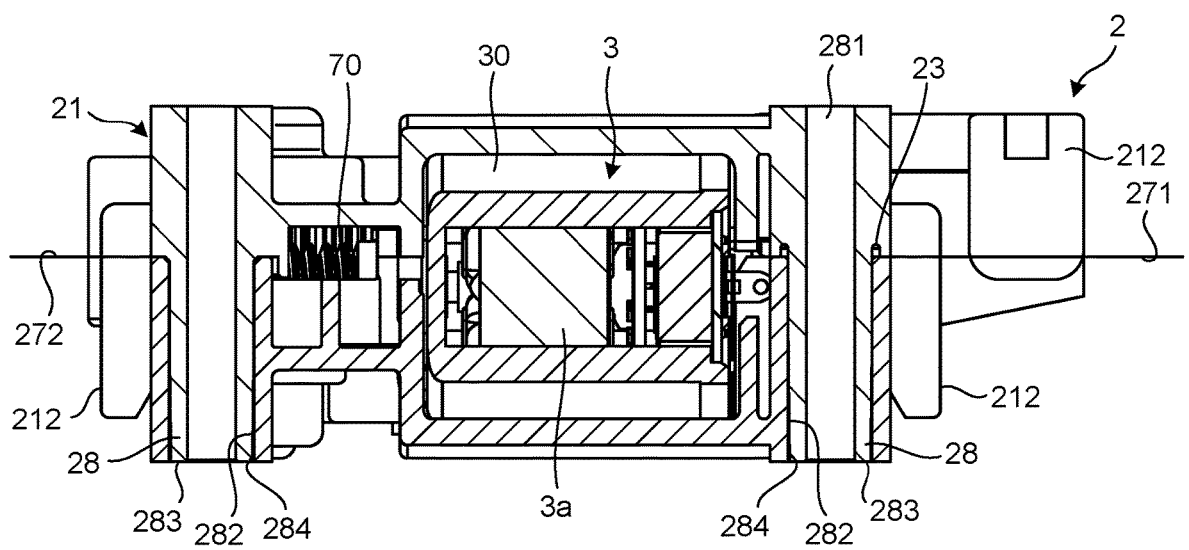
FIG. 7 is a sectional view cut along the line II-II in FIG. 1.
Figure 8:
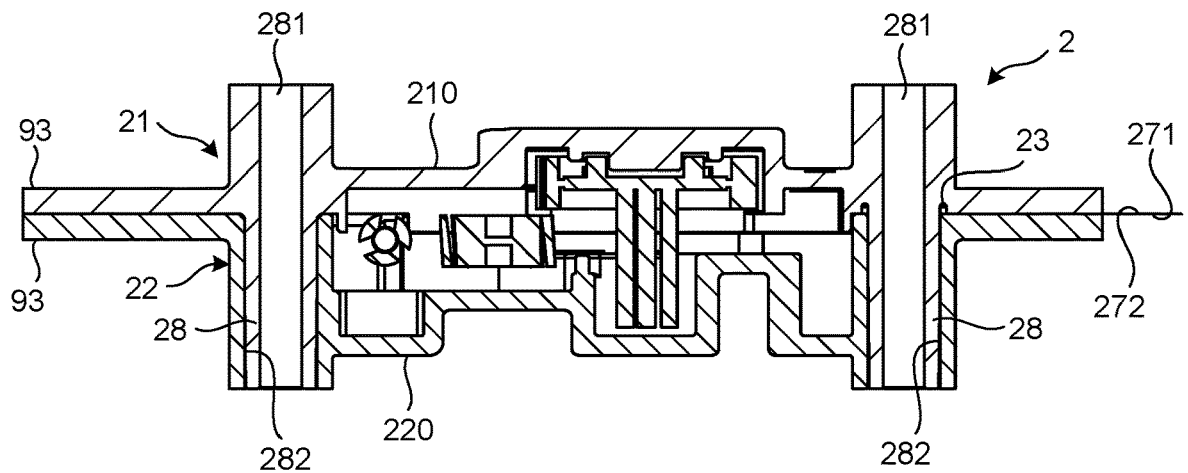
FIG. 8 is a sectional view cut along the line III-III in FIG. 1.
Figure 9:
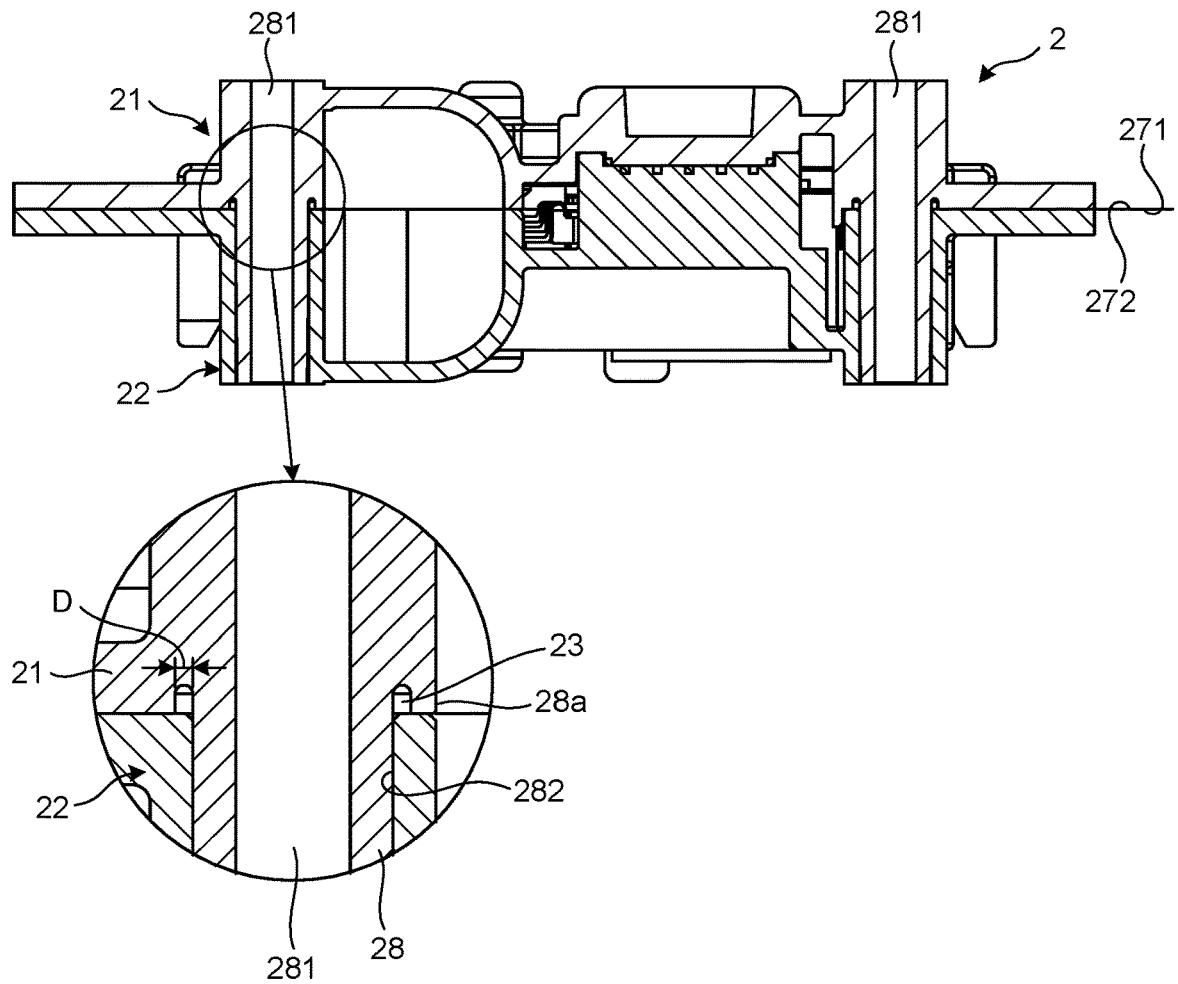
FIG. 9 is a sectional view cut along the line IV-IV in FIG. 1.

FIG. 7 is a sectional view cut along the line II-II in FIG. 1. FIG. 8 is a sectional view cut along the line III-III in FIG. 1. FIG. 9 is a sectional view cut along the line IV-IV in FIG. 1.

As illustrated in FIG. 6 to FIG. 9, when the first housing 21 and the second housing 22 are abutted and joined to each other, each of the four protrusion parts 28 is fitted by being pressed into each of the four second through holes 282. That is, in the present embodiment, the outer diameter of the protrusion part 28 is made slightly larger than the bore diameter of the second through hole 282 so that the protrusion part 28 is press-fitted into the second through hole 282.

Moreover, in the present embodiment, the length (hereinafter, referred to as a protrusion length) L1 of the protrusion part 28 (see FIG. 10) is made equivalent to the length (total length) L2 of the second through hole 282 (see FIG. 10). In the fitting state, a flat part of an end part (tip end) 283 of the protrusion part 28 and an opening part of an end 284 of the second through hole 282 are positioned substantially on the same plane.

In this manner, in the rotating device 1 according to the embodiment, the housing 2 is formed by fitting the protrusion parts 28 protruding from the four corners of the first surface part 210 of the first housing 21 into the second through holes 282 formed at the four corners of the second housing 22 corresponding to the four protrusion parts 28.

Accordingly, when the first housing 21 and the second housing 22 are molded by resin, and for example, even if warpage occurs in the first housing 21 and the second housing 22 due to the shrinkage of resin, the warpage is corrected by fitting the protrusion parts 28 deeply into the second through holes 282 when the housing 2 is assembled. Hence, it is possible to minimize deviation from the design dimensions of the housing 2 as much as possible. Because the arrangement of the motor 3 and the gear group 6, as well as the meshing accuracy of gears are improved, it is possible to provide the rotating device 1 that suppresses the generation of abnormal noise or the like.

In the examples illustrated in FIG. 6 to FIG. 9, the protrusion length L1 of the protrusion part 28 is equivalent to the total length L2 of the second through hole 282. However, the protrusion length L1 of the protrusion part 28 and the total length L2 of the second through hole 282 only need to satisfy the relation of the following equation 1. By satisfying the relation of the equation 1, for example, even if warpage occurs in the first housing 21 or the second housing 22 during molding, it is possible to correct the warpage that has occurred in one of the housings 21 and 22 when the first housing 21 and the second housing 22 are combined to form the housing 2.

$$0.3 \cdot L1/L2 \cdot 1.0 \qquad \text{(equation 1)}$$

The protrusion length L1 of the protrusion part 28 is distance from the first contact surface 271 of the first housing 21 to the tip end 283 of the protrusion part 28. The total length L2 of the second through hole 282 is distance from the second surface part 220 of the second housing 22 to the second contact surface 272. Moreover, the above equation 1 indicates that the protrusion length L1 of the protrusion part 28 and the total length L2 of the second through hole 282 are in the relation of $L1 \leq L2$.

Moreover, a relation between thickness H of the housing 2 in a region provided with the protrusion part 28 (see FIG. 10 and FIG. 11) and the protrusion length L1 of the protrusion part 28 preferably satisfies the relation of the following equation 2.

$$0.3*H \leq L1 \leq 0.8*H \qquad \text{(equation 2)}$$

By satisfying the relation of the equation 2, for example, during molding, it is possible to suppress the occurrence of warpage while maintaining the required strength of the first housing 21.

Figure 10:
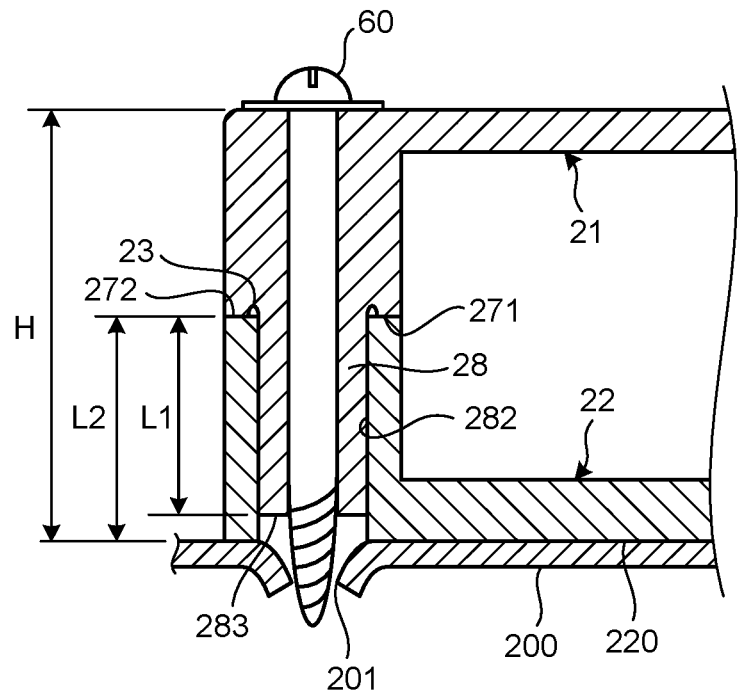
FIG. 10 is a schematic explanatory view illustrating an example of a state in which the rotating device according to the embodiment is mounted on a mounting surface.
Figure 11:
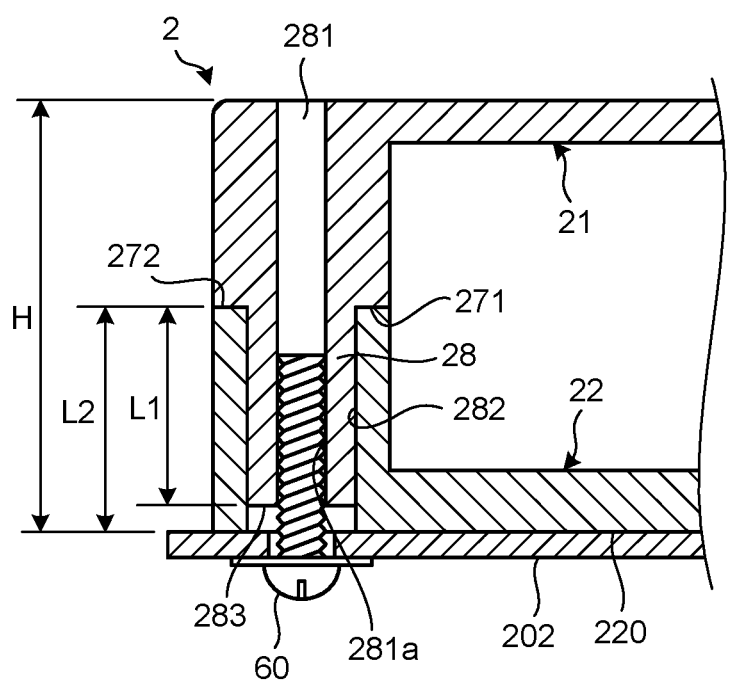
FIG. 11 is a schematic explanatory view illustrating an example of a state in which the rotating device according to the embodiment is mounted on the mounting surface.

FIG. 10 and FIG. 11 are each a schematic explanatory view illustrating an example of a state in which the rotating device 1 according to the embodiment is mounted on a mounting surface. For example, in FIG. 10 and FIG. 11, the protrusion length L1 of the protrusion part 28 is made shorter than the total length L2 of the second through hole 282. However, even when the protrusion length L1 is made shorter, it is preferable to set the protrusion length L1 at least within the range of equation 1. More preferably, the lower limit of the protrusion length L1 of the protrusion part 28 may be equal to or more than a half of the total length L2 of the second through hole 282.

Incidentally, in the example illustrated in FIG. 10, the mounting surface is formed of a sheet metal 200, and a fastening hole 201 is provided by performing a burring process and a tapping process on the sheet metal 200. The rotating device 1 is mounted on the sheet metal 200 by the fastening tool 60, by aligning the fastening hole 201 with the first through hole 281 provided at the protrusion part 28 of the first housing 21. In this process, because the protrusion length L1 of the protrusion part 28 and the total length L2 of the second through hole 282 satisfy the relation of L1≤L2, when the fastening is carried out via the fastening tool 60, it is possible to bring the first contact surface 271 and the second contact surface 272 into contact with each other securely, by the fastening force of the fastening tool 60.

Moreover, as illustrated in FIG. 9 and FIG. 10, in the rotating device 1 according to the present embodiment, an annular groove part 23 is formed at the first contact surface 271 so as to surround the periphery of the base of the protrusion part 28 provided at the first housing 21 (see FIG. 5).

That is, when the protrusion part 28 of the first housing 21 is to be fitted into the second through hole 282 of the second housing 22, to prevent a situation that the protrusion part 28 does not fit into the second through hole 282 due to a slight misalignment, as illustrated in FIG. 9, the elasticity of the protrusion part 28 formed of resin is increased, by forming an aperture D between a base 28a of the protrusion part 28 and the first contact surface 271. Accordingly, when the tip end of the protrusion part 28 fits the second through hole 282, even if the shaft centers of the protrusion part 28 and the second through hole 282 are slightly misaligned with each other, it is possible to press fit the protrusion part 28 into the second through hole 282.

Furthermore, in the example illustrated in FIG. 11, a female screw part 281a is formed at the inner peripheral surface of the first through hole 281 provided at the protrusion part 28 of the first housing 21, and a predetermined plate body 202 is used as the mounting surface. Then, a hole part 203 formed at the plate body 202 and the first through hole 281 provided at the protrusion part 28 of the first housing 21 are aligned with each other, the fastening tool 60 such as a bolt is inserted into the first through hole 281 from the plate body 202 side, and the rotating device 1 is screwed to the plate body 202.

Figure 12:
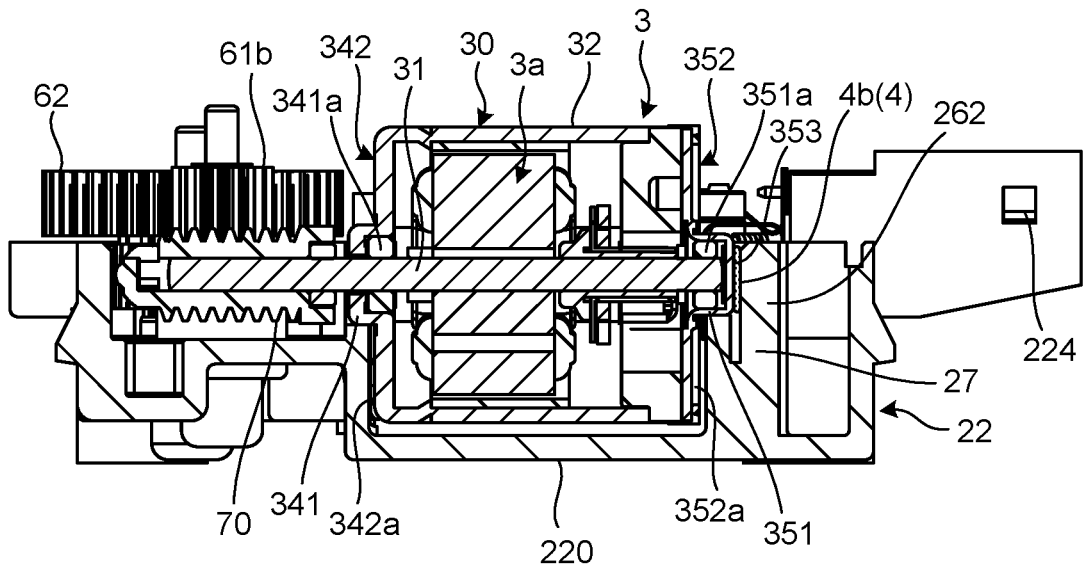
FIG. 12 is a sectional view cut along the line VI-VI in FIG. 4B.
Figure 13:
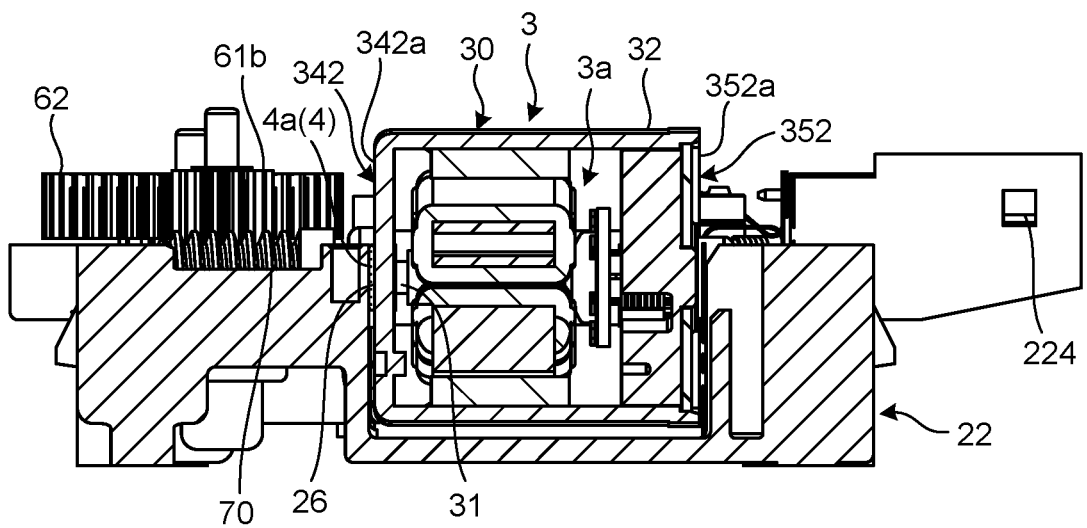
FIG. 13 is a sectional view cut along the line VII-VII in FIG. 4B.
Figure 14:
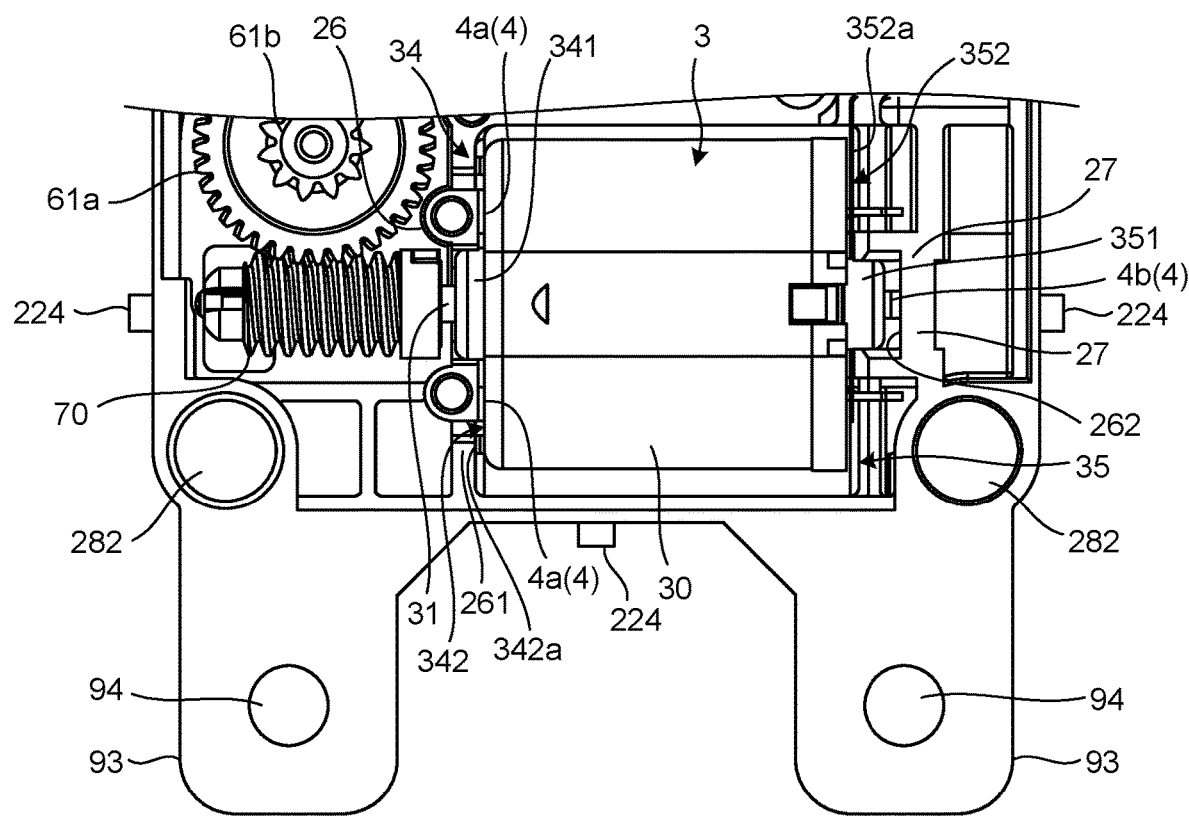
FIG. 14 is an explanatory view illustrating an arrangement of a holding part in the rotating device according to the embodiment in a plan view.
Figure 15A:
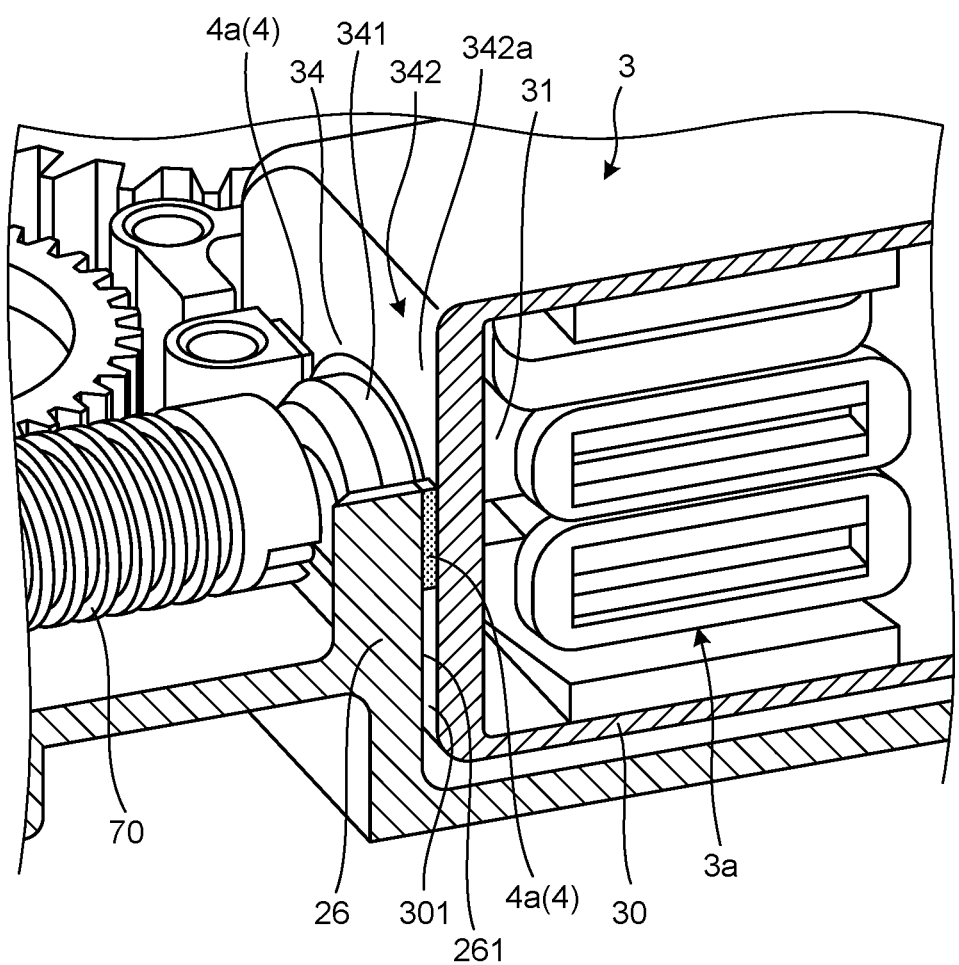
FIG. 15A is an explanatory view of a first holding part when an adhesive having elasticity is used.
Figure 15B:
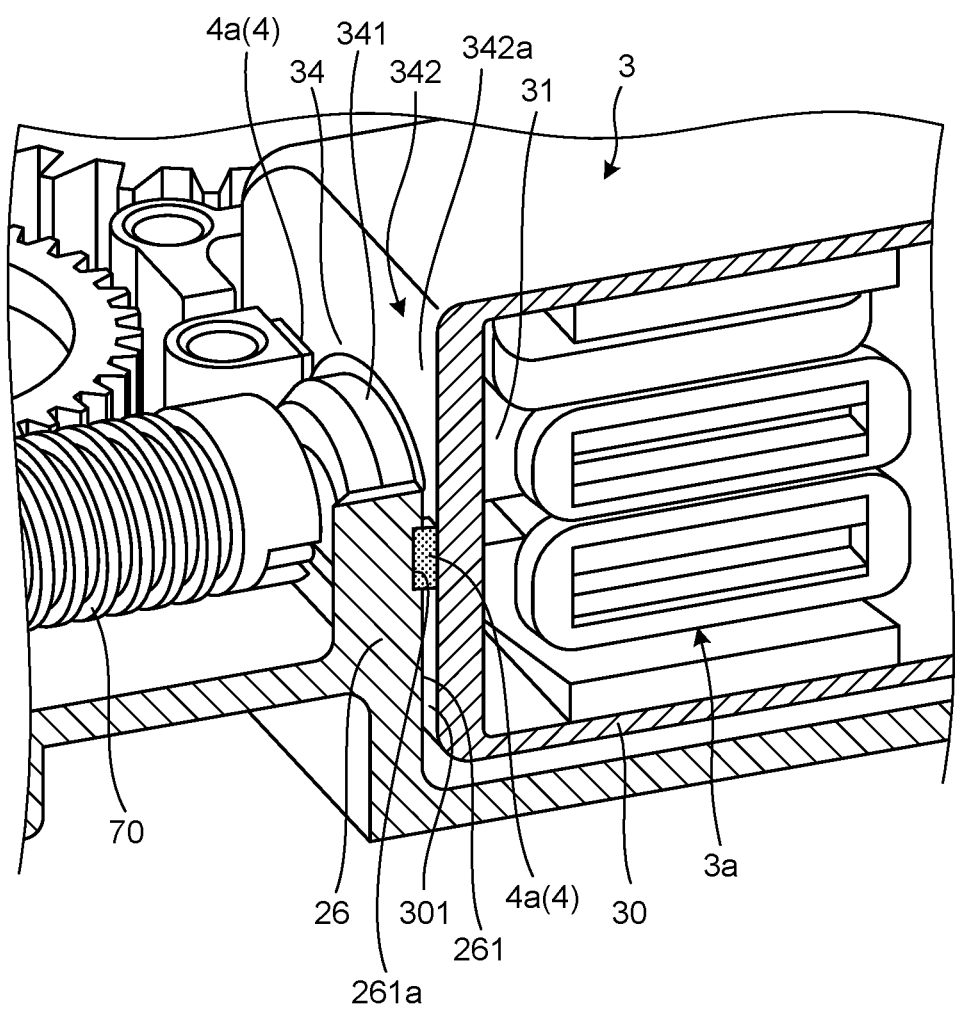
FIG. 15B is a diagram illustrating a first modification of the holding part illustrated in FIG. 15A.
Figure 15C:
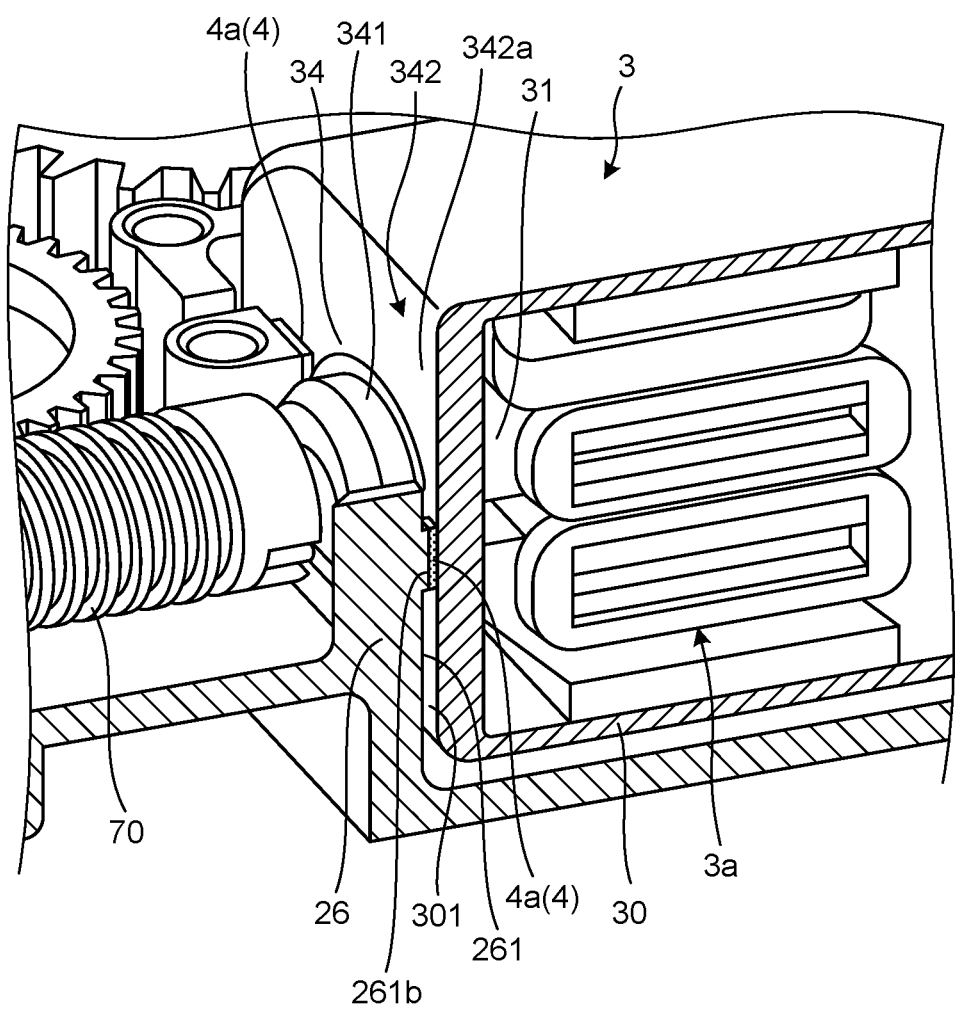
FIG. 15C is a diagram illustrating a second modification of the holding part illustrated in FIG. 15A.
Figure 16A:
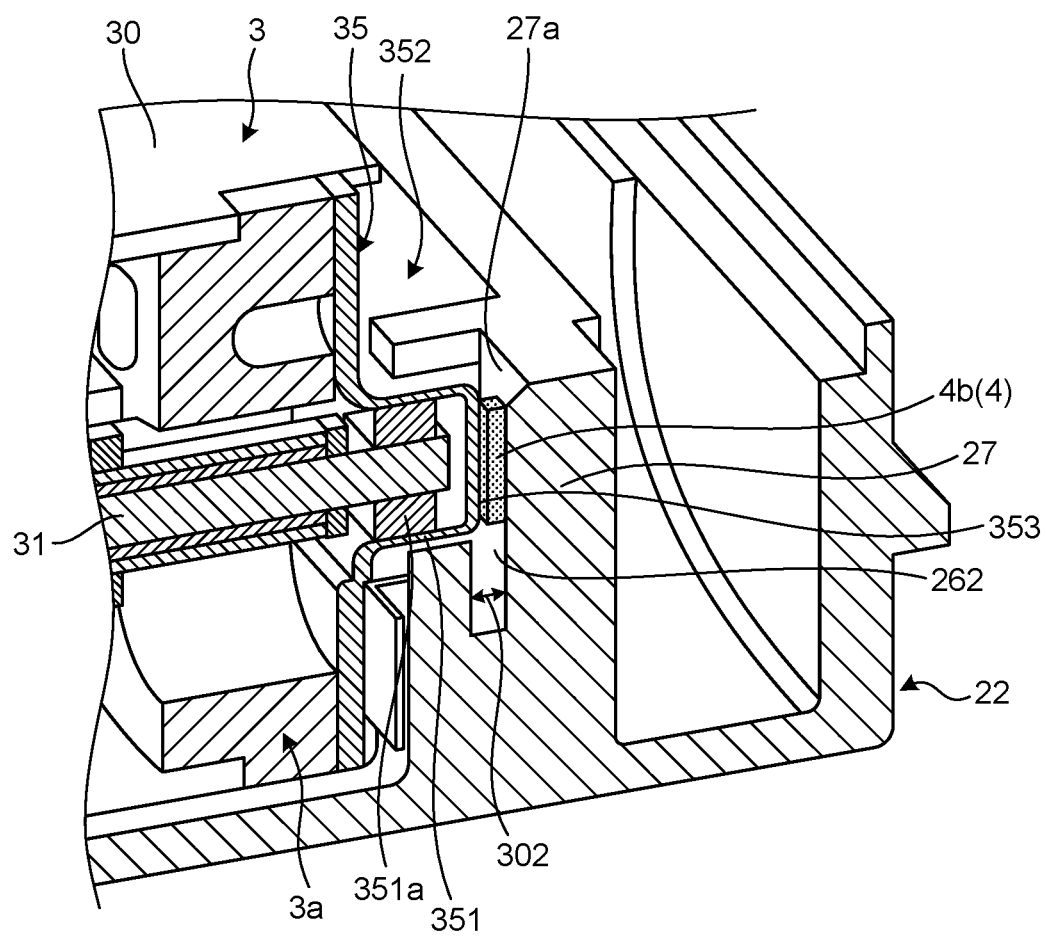
FIG. 16A is an explanatory view of a second holding part when an adhesive having elasticity is used.
Figure 16B:
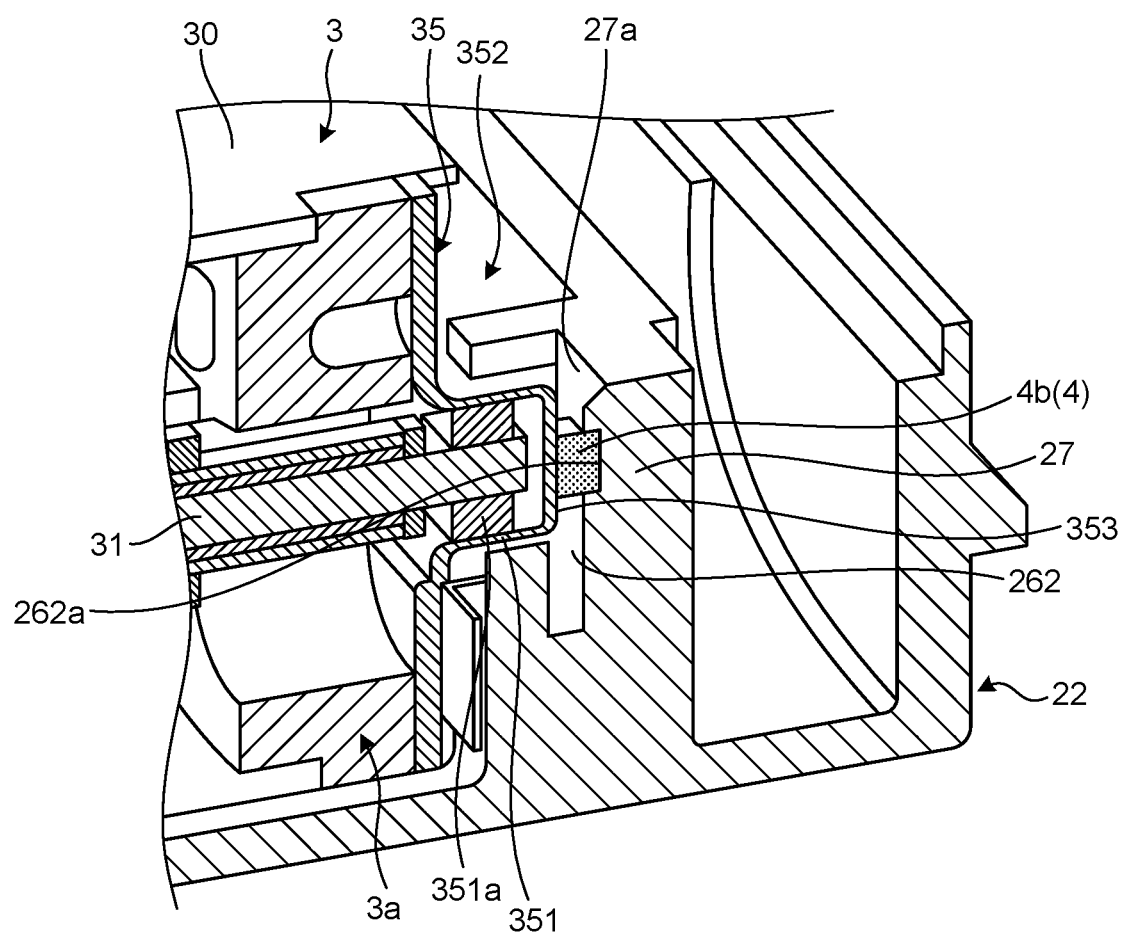
FIG. 16B is a diagram illustrating a first modification of the holding part illustrated in FIG. 16A.
Figure 16C:
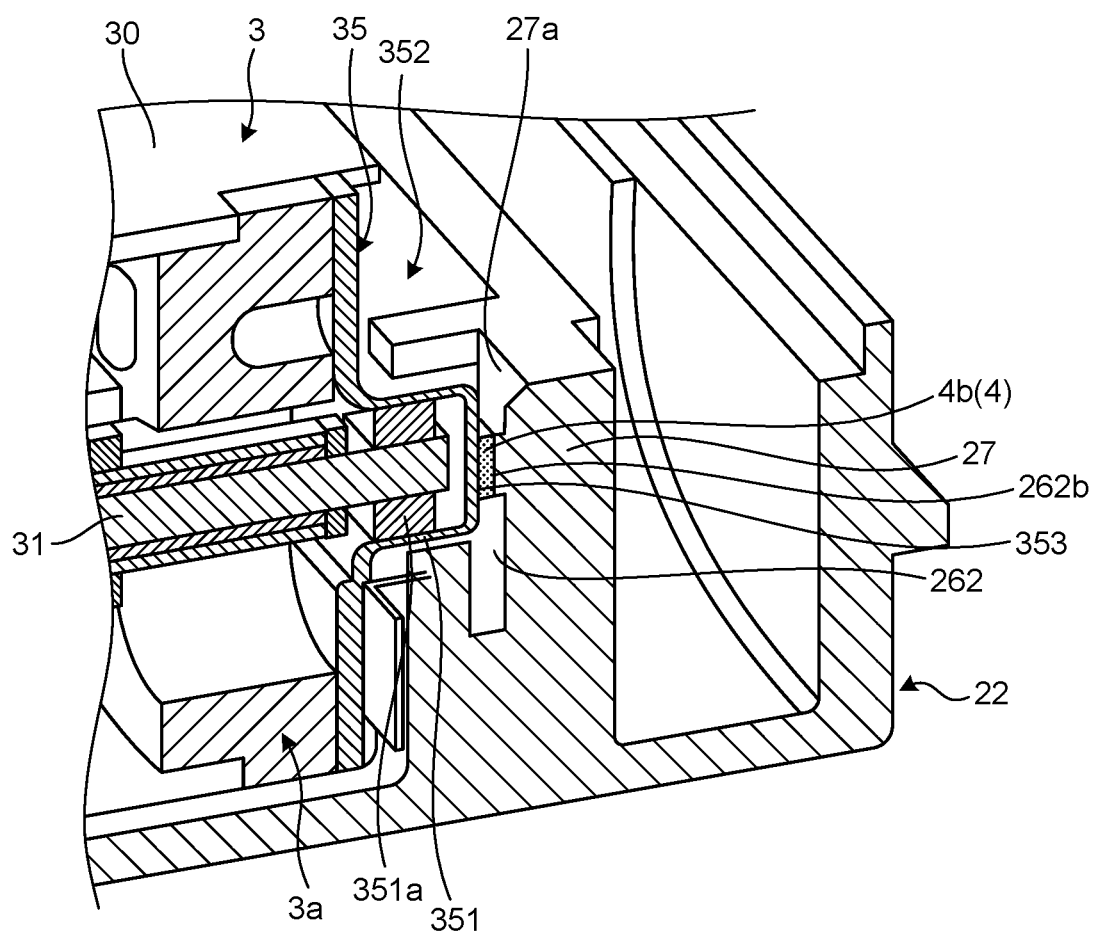
FIG. 16C is a diagram illustrating a second modification of the holding part illustrated in FIG. 16A.

Next, a holding structure of the motor 3 in the present embodiment will be described with reference to FIG. 4A, FIG. 4B, FIG. 4D, and FIG. 12 to FIG. 16C. FIG. 12 is a sectional view cut along the line VI-VI in FIG. 4B. FIG. 13 is a sectional view cut along the line VII-VII in FIG. 4B. Moreover, FIG. 14 is an explanatory view illustrating an arrangement of a holding part in the rotating device 1 according to the embodiment in a plan view. Furthermore, FIG. 15A is an explanatory view of a first holding part when a resin member having elasticity (hereinafter, may be referred to as an adhesive having elasticity) is used. FIG. 16A is an explanatory view of a second holding part when an adhesive having elasticity is used. Still furthermore, FIG. 15B is a diagram illustrating a first modification of the holding part illustrated in FIG. 15A. FIG. 15C is a diagram illustrating a second modification of the holding part illustrated in FIG. 15A. Still furthermore, FIG. 16B is a diagram illustrating a first modification of the holding part illustrated in FIG. 16A. FIG. 16C is a diagram illustrating a second modification of the holding part illustrated in FIG. 16A.

First, the configuration of the motor 3 will be briefly described. As illustrated in FIG. 4A and FIG. 4B, the motor 3 in the present embodiment includes the rotating shaft 31 and a frame 30 accommodating a function unit 3a (see FIG. 7, FIG. 12, FIG. 13, and FIG. 15A). In this example, the function unit 3a is a set of components required to drive the motor 3, such as a stator and a rotor including a magnet, a coil, and the like, other than the rotating shaft 31. That is, the motor 3 includes the frame 30 and the rotating shaft 31 connected to the worm gear 70. The frame 30 includes a tubular-shaped body 32 extending in the axial direction of the motor 3, and end parts (a first end part 34 and a second end part 35) in the axial direction of the motor 3. The first end part 34 is an end part on the worm gear 70 side, and the second end part 35 is an end part on the side opposite to the worm gear 70 (see FIG. 14). In the following explanation, a surface perpendicular to the rotating shaft 31 of the frame 30 may be defined as a frame vertical surface, and a surface parallel to the rotating shaft 31 of the frame 30 may be defined as a frame parallel surface. As illustrated in FIG. 4A, the frame 30 includes a tubular-shaped frame main body 360 having a bottom part and an opening, and a plate 370 for closing the opening of the frame main body 360. The function unit 3a and a part of the rotating shaft 31 are accommodated in a housing formed by the frame main body 360 and the plate 370. FIG. 4A illustrates a part of a bracket 380 being a component of the function unit 3a. The bracket 380 holds a brush and the like coming into contact with a commutator fixed to the rotating shaft 31. The frame main body 360 and the plate 370 store the bracket 380 by interposing a part of the bracket 380 between the frame main body 360 and the plate 370. The exterior surface of the motor 3 includes, in addition to the exterior surface of the frame 30, the exterior surface of a part of the bracket 380 interposed between the frame main body 360 and the plate 370. That is, the first end part 34 is formed by the end part of the frame main body 360 on the worm gear 70 side, the second end part 35 is formed by the plate 370, and the tubular-shaped body 32 is formed including the frame main body 360, the plate 370, and the bracket 380.

Moreover, the frame 30 includes a first outer side surface on the first, end part 34 side and a second outer side surface at the second end part side. In other words, the first outer side surface includes a portion of the outer side surface forming the first end part 34, and a portion of the outer side surface surrounding the first end part 34. Hereinafter, the portion of the outer side surface surrounding the first end part 34 is referred to as a third outer side surface 342a. Similarly, the second outer side surface forms the second end part 35 of the frame 30. That is, the second outer side surface includes a portion of the outer side surface forming the second end part 35, and a portion of the outer side surface surrounding the second end part 35. Hereinafter, the portion of the outer side surface surrounding the second end part 35 is referred to as a fourth outer side surface 352a. Furthermore, the first end part 34 and the second end part 35 in the tubular-shaped body 32 each has a surface, and the rotating shaft 31 protrudes from the surface of the first end part 34. The worm gear 70 meshing with the first transmission gear 61 is mounted on the protruded portion.

As illustrated in FIG. 12 to FIG. 14, the first end part 34 includes a first bearing part 341 for rotatably supporting the rotating shaft 31 on the worm gear 70 side via a bearing 341a, and a first side part 342 extending in a direction intersecting the axial direction of the motor 3. The first side part 342 includes the third outer side surface 342a that is a surface intersecting the axial direction of the motor 3

(vertical surface), and that is formed continuously to the first bearing part 341. The third outer side surface 342a is an example of the frame vertical surface. Alternatively, the second end part 35 includes a second bearing part 351 for rotatably supporting the end part of the rotating shaft 31 on the side opposite to the worm gear 70 via a bearing 351a, and a second side part 352 extending in a direction intersecting the axial direction of the motor 3. The second side part 352 includes the fourth outer side surface 352a that is a surface intersecting the axial direction of the motor 3 (vertical surface), and that is formed continuously to the second bearing part 351. The fourth outer side surface 352a is an example of the frame vertical surface.

The first bearing part 341 includes the bearing 341a (see FIG. 12), and the first end part 34 of the frame 30. The second bearing part 351 includes the bearing 351a (see FIG. 12 and FIG. 16A), and the second end part 35 of the frame 30. The first end part 34 includes the third outer side surface 342a intersecting the axial direction of the motor 3, and the second end part 35 includes the fourth outer side surface 352a intersecting the axial direction of the motor 3.

On the other hand, as illustrated in FIG. 4D, a motor arrangement part 228 is provided in the second housing 22, and the motor 3 is placed in the motor arrangement part 228 (see FIG. 4B). On the motor arrangement part 228, a first holding wall 26 serving as a wall part and a second holding wall 27 serving as a wall part are formed. Each of the first holding wall 26 and the second holding wall 27 faces the first end part 34 and the second end part 35 of the frame 30 of the motor 3 respectively. The first holding wall 26 and the second holding wall 27 include surfaces 261 and 262 extending in a direction intersecting the axial direction of the motor 3 (surfaces perpendicular to the axial direction of the motor 3). The first holding wall 26 and the second holding wall 27 each function as a holding part of the motor 3 in the present embodiment, and the first holding wall 26 corresponds to a first holding part, and the second holding wall 27 corresponds to a second holding part.

A first recessed part 26a recessed toward the inside of the second housing 22 is formed at the first holding wall 26. The first bearing part 341 of the motor 3 is engaged with the first recessed part 26a, and the second bearing part 351 of the motor 3 is engaged with a second recessed part 26b formed at the second holding wall 27. That is, the first recessed part 26a in the second housing 22 abuts and holds the first bearing part 341 of the frame 30 in a direction perpendicular to the rotating shaft 31 of the motor 3 (referred to as a motor shaft vertical direction). Moreover, the second recessed part 26b in the second housing 22 abuts and holds the second bearing part 351 of the frame 30 in the motor shaft vertical direction.

As illustrated in FIG. 5, in the first housing 21, a motor arrangement part 229 for arranging the motor 3 is provided. In the motor arrangement part 229, a third holding wall 21a serving as a wall part and facing the first end part 34 of the frame 30 of the motor 3 and a fourth holding wall 21c serving as a wall part and facing the second end part 35 of the frame 30 of the motor 3 respectively are formed. A third recessed part 21b recessed toward the inside of the first housing 21 is formed at the third holding wall 21a, and the first bearing part 341 of the motor 3 is engaged with the third recessed part 21b. Moreover, a protruding part 21d protruding toward the outside of the first housing 21 is formed at the fourth holding wall 21c, and the second bearing part 351 is engaged with the protruding part 21d. That is, the third recessed part 21b of the first housing 21 abuts and holds the first bearing part 341 of the frame 30 in a direction perpendicular to the rotating shaft 31 of the motor 3 (referred to as the motor shaft vertical direction). Moreover, the protruding part 21d of the first housing 21 abuts and holds the second bearing part 351 of the frame 30 in the motor shaft vertical direction.

When the rotating shaft 31 of the motor 3 described above accommodated in the housing 2 is rotated, the reaction force is applied in the axial direction of the motor 3 via the worm gear 70. The reaction force causes the motor 3 to instantaneously move in the axial direction. When the motor 3 is moved, the meshing state between the worm gear 70 and the first transmission gear 61 is changed, and may cause abnormal noise.

Accordingly, as illustrated in FIG. 12 to FIG. 14, the motor 3 in the rotating device 1 according to the present embodiment is held by the holding part (first holding wall 26 (may also be referred to as a first holding part) and second holding wall 27 (may also be referred to as a second holding part)) formed in the housing 2 via a resin member 4 having elasticity (hereinafter, may be referred to as an adhesive 4 having elasticity).

Moreover, the adhesive 4 having elasticity is disposed between the surface of the holding part (first holding wall 26 and second holding wall 27) intersecting the axial direction of the motor 3 and the end parts 34 and 35 of the frame 30. When the end part 34 in the axial direction of the motor 3 is the first end part 34, the frame 30 includes the second end part 35. When the surface intersecting the axial direction of the motor 3 of the first holding wall 26 is the first holding surface 261 intersecting the axial direction of the motor 3 on the first end part 34 side in the frame 30, the holding part includes the second holding surface 262 intersecting the axial direction of the motor 3 on the second end part 35 side. When the adhesive 4 having elasticity is a first adhesive 4a having elasticity, a second adhesive 4b having elasticity is disposed between the second end part 35 and the second holding surface 262 intersecting the axial direction of the motor 3 on the second end part 35 side.

More specifically, at least one of a known rubber-based adhesive, a silicone-based adhesive, a modified silicone-based adhesive, a urethane-based adhesive, or an epoxy-based adhesive may be suitably used as the adhesive 4 having elasticity, and the adhesive has a predetermined elasticity even after being cured. That is, in the present embodiment, the resin member 4 is not a member molded with a mold such as an O-ring, but is a member obtained when a liquid adhesive (adhesive 4a and adhesive 4b) applied between the motor 3 and the holding part (first holding wall 26 and second holding wall 27) is cured. The liquid adhesive (adhesive 4a and adhesive 4b) is an adhesive to be a member having elasticity after being cured. Moreover, to the shape of the resin member 4 having elasticity after being cured, the shape (of the frame 30) of the motor 3 and the shape of the holding part (first holding wall 26 and second holding wall 27) are transferred. The resin member 4 having elasticity after being cured is an adhesive for adhering (the frame 30 of) the motor 3 and the holding part (first holding wall 26 and second holding wall 27). As illustrated in FIG. 14 to FIG. 16C, the adhesive 4 having elasticity is disposed between the first holding surface 261 perpendicular to the axial direction of the motor 3 in the first holding wall 26 and the first end part 34 of the frame 30, and between the second holding surface 262 perpendicular to the axial direction of the motor 3 in the second holding wall 27 and the second end part 35 of the frame 30.

In this process, the first end part 34 facing the first holding surface 261 of the first holding wall 26 is the third outer side surface 342*a*, and the second end part 35 facing the second holding surface 262 of the second holding wall 27 is an outer surface (vertical outer surface) 353 intersecting the axial direction of the second bearing part 351. The outer surface 353 is an example of the frame vertical surface.

That is, as illustrated in FIG. 15A, a gap 301 is formed between the first holding surface 261 of the first holding wall 26 and the third outer side surface 342*a* of the first end part 34 in the frame 30 facing each other, so as enough to dispose the adhesive 4 having elasticity. In this manner, the third outer side surface 342*a* being the frame vertical surface and the second housing 22 (first holding surface 261) are not abutted, have the gap 301, and the adhesive 4*a* is applied between the third outer side surface 342*a* and the second housing 22 (first holding surface 261). The liquid adhesive 4*a* is cured after being filled into the gap 301, and becomes the resin member 4 having elasticity for filling the gap 301. Moreover, the shape (of the third outer side surface 342*a*) of the motor 3 and the shape (of the first holding surface 261) of the second housing 22 are transferred to the shape of the resin member 4 having elasticity after being cured. The resin member 4 having elasticity after being cured is an adhesive for adhering (the third outer side surface 342*a* of) the motor 3 and (the second holding surface 262 of) the second housing 22. The third outer side surface 342*a* is held by the second housing 22 (first holding surface 261) by the resin member 4 having elasticity. Similarly, as illustrated in FIG. 16A, a gap 302 to dispose the adhesive 4 having elasticity is also formed between the second holding surface 262 of the second holding wall 27 and the outer surface 353 of the second bearing part 351 in the frame 30. In this manner, the outer surface 353 being the frame vertical surface and the second housing 22 (second holding surface 262) are not abutted, have the gap 302, and the adhesive 4*b* is applied between the outer surface 353 and the second housing 22 (second holding surface 262). The liquid adhesive 4*b* is cured after being filled into the gap 302, and becomes the resin member 4 having elasticity for filling the gap 302. Moreover, to the shape of the resin member 4 having elasticity after being cured, the shape (of the outer surface 353) of the motor 3 and the shape (of the second holding surface 262) of the second housing 22 are transferred. The resin member 4 having elasticity after being cured is an adhesive for adhering (the outer surface 353 of) the motor 3 and (the second holding surface 262 of) the second housing 22. The outer surface 353 is held by the second housing 22 (second holding surface 262) by the resin member 4 having elasticity. The size of the gaps 301 and 302 is, for example, 0.2 mm, and may be smaller than the thickness of the first bearing part 341 in the axial direction, and may be smaller than the thickness of the first holding wall 26 in the axial direction.

In this manner, in the rotating device 1 according to the present embodiment, the motor 3 is held by the holding part formed in the housing 2 via the adhesive 4 having elasticity. Accordingly, even at a low cost, it is possible to suppress the motor 3 from moving in the axial direction by absorbing the reaction force applied in the axial direction of the motor 3, and suppress the generation of abnormal noise caused by the movement. Moreover, by providing the gaps, the contact area of the housing 2 with respect to the motor 3 is reduced, and it is possible to suppress the propagation of the vibration of the motor 3 to the housing 2.

Similarly, in the rotating device 1 according to the present embodiment, the motor 3 is held by disposing the adhesive 4 having elasticity between the second holding surface 262 of the second holding wall 27 being the holding part formed in the housing 2 and the outer surface 353 of the second bearing part 351 in the frame 30. Accordingly, with such a configuration also, by absorbing the reaction force applied in the axial direction of the motor 3, it is possible to suppress the motor 3 from moving in the axial direction, and thus suppress the generation of abnormal noise caused by the movement of the motor 3. Moreover, by providing the gaps, the contact area of the housing 2 with respect to the motor 3 is reduced, and it is possible to suppress the propagation of the vibration caused by the movement of the motor 3 to the housing 2.

In the present embodiment, as illustrated in FIG. 15B, FIG. 15C, FIG. 16B, and FIG. 16C, a step part may be provided at the outer periphery of an application area of the adhesive (adhesive 4*a* and adhesive 4*b*) at the surface of the second housing 22 facing the frame vertical surface. In the example illustrated in FIG. 15B, in an application area at the first holding surface 261, a recessed part 261*a* recessed from the outer periphery of the application area of the adhesive (adhesive 4*a* and adhesive 4*b*) is formed in a direction separating from the third outer side surface 342*a*. Then, the adhesive 4*a* is applied so as to fill between the recessed part 261*a* and the third outer side surface 342*a*, and becomes the resin member 4 having elasticity. Moreover, in the example illustrated in FIG. 15C, in an application area at the first holding surface 261, a protruding part 261*b* protruding from the outer periphery of the application area of the adhesive (adhesive 4*a* and adhesive 4*b*) is formed in a direction approaching the third outer side surface 342*a*. Then, the adhesive 4*a* is applied so as to fill between the protruding part 261*b* and the third outer side surface 342*a*, and becomes the resin member 4 having elasticity. Furthermore, to the shape of the resin member 4 having elasticity after being cured, the shape (of the third outer side surface 342*a*, the third outer side surface 342*a*, and the third outer side surface 342*a*) of the motor 3, and the shape (of the first holding surface 261, the recessed part 261*a*, and the protruding part 261*b*) of the second housing 22 are transferred. The resin member 4 having elasticity after being cured is an adhesive for adhering the motor 3 and the second housing 22.

Moreover, in the example illustrated in FIG. 16B, in an application area at the second holding surface 262, a recessed part 262*a* recessed from the outer periphery of the application area is formed in a direction separating from the outer surface 353. Then, the adhesive 4*b* is applied so as to fill between the recessed part 262*a* and the outer surface 353, and becomes the resin member 4 having elasticity. Moreover, in the example illustrated in FIG. 16C, in an application area at the second holding surface 262, a protruding part 262*b* protruding from the outer periphery of the application area is formed in a direction approaching the outer surface 353. Then, the adhesive 4*b* is applied so as to fill between the protruding part 262*b* and the outer surface 353, and becomes the resin member 4 having elasticity. Furthermore, to the shape of the resin member 4 having elasticity after being cured, the shape (of the outer surface 353, the outer surface 353, and the outer surface 353) of the motor 3 and the shape (of the recessed part 262*a*, the protruding part 261*b*, and the second holding surface 262) of the second housing 22 are transferred. The resin member 4 having elasticity after being cured is an adhesive for adhering the motor 3 and the second housing 22.

Incidentally, in the present embodiment, as illustrated in FIG. 16A to FIG. 16C, a inclined surface 27*a* is formed at the upper part of the second holding wall 27 (on the first housing 21 side) where the gap width becomes wider toward the surface part of the housing 2, so that the adhesive 4 having elasticity can be easily filled into the gap 302. Such a inclined surface 27a may also be formed at the first holding wall 26 in addition to the second holding wall 27.

Figure 17A:
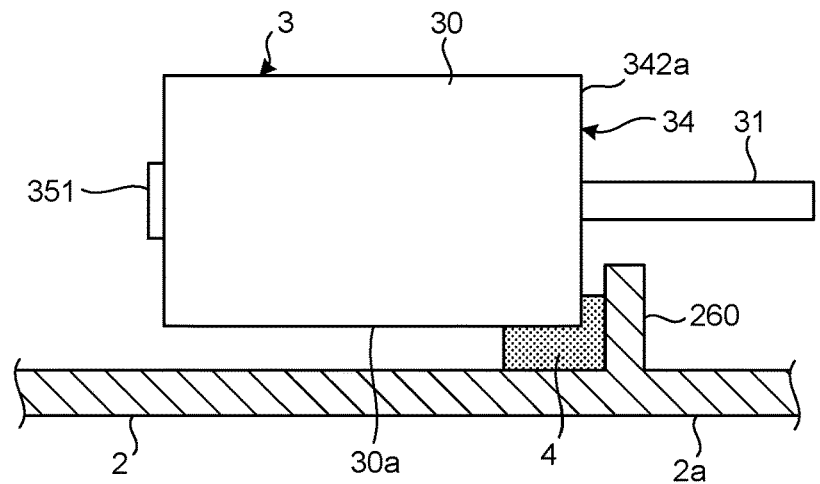
FIG. 17A is a schematic explanatory view illustrating a first modification of a support structure of a motor in the rotating device according to the embodiment.
Figure 17B:
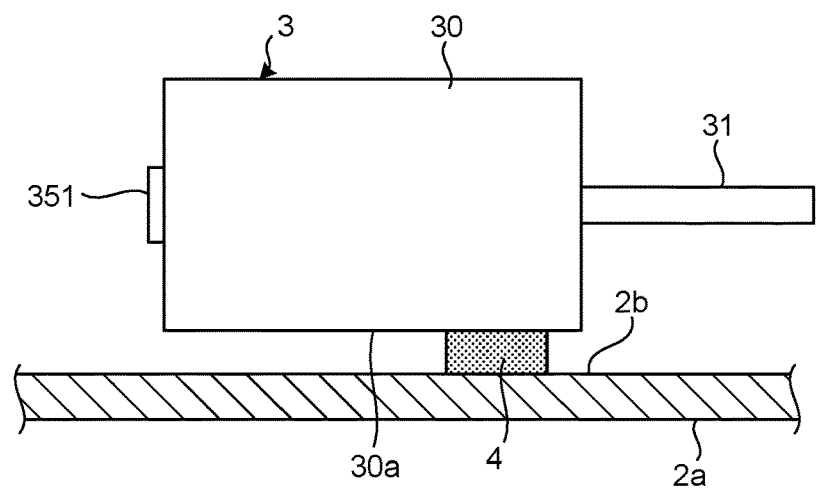
FIG. 17B is a schematic explanatory view illustrating a second modification of the support structure of the motor in the rotating device according to the embodiment.
Figure 17C:
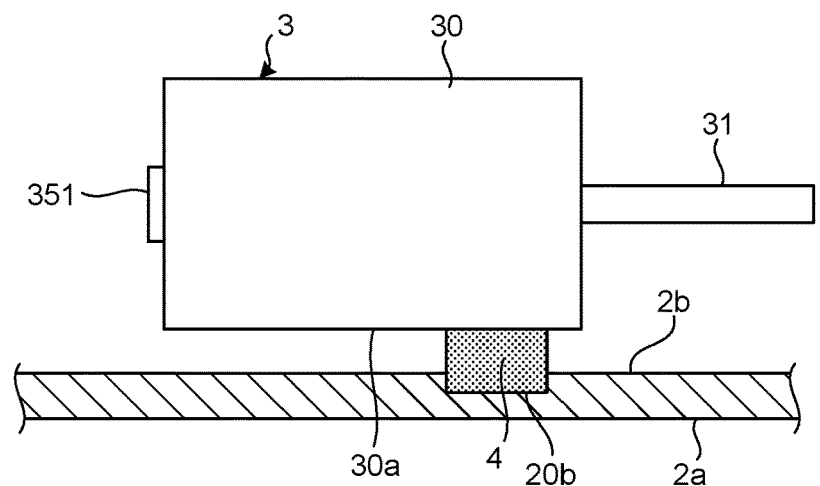
FIG. 17C is a schematic explanatory view illustrating a third modification of the support structure of the motor in the rotating device according to the embodiment.
Figure 17D:
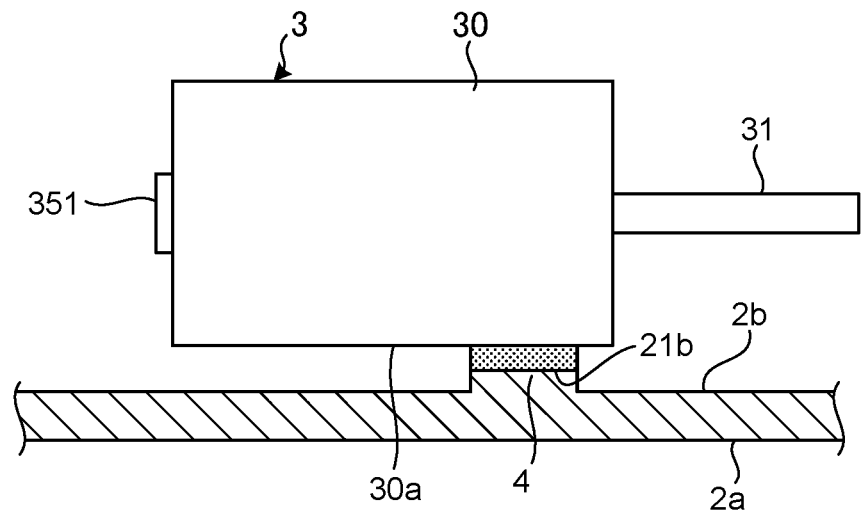
FIG. 17D is a schematic explanatory view illustrating a fourth modification of the support structure of the motor in the rotating device according to the embodiment.
Figure 17E:
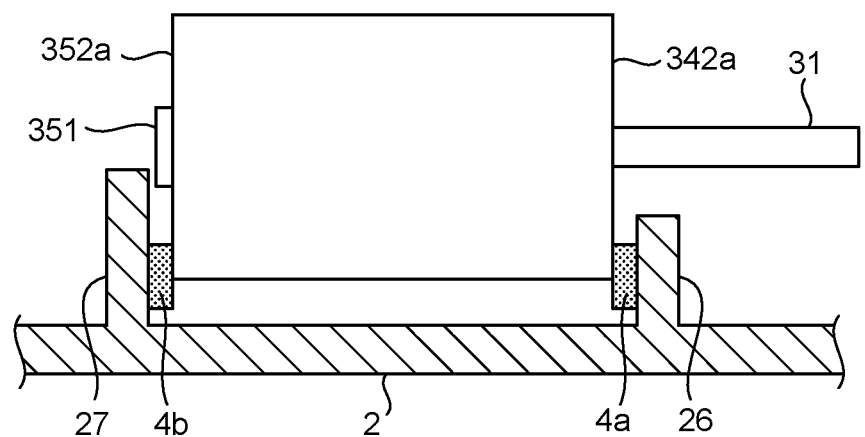
FIG. 17E is a schematic explanatory view illustrating a fifth modification of the support structure of the motor in the rotating device according to the embodiment.

The support structure of the motor 3 in the rotating device 1 according to the embodiment is not limited to the examples described above, and for example, may also be configured as illustrated in FIG. 17A to FIG. 17E. FIG. 17A is a schematic explanatory view illustrating a first modification of a support structure of the motor 3 in the rotating device 1 according to the embodiment. FIG. 17B is a schematic explanatory view illustrating a second modification of the support structure of the motor 3 in the rotating device 1 according to the embodiment. FIG. 17C is a schematic explanatory view illustrating a third modification of the support structure of the motor 3 in the rotating device 1 according to the embodiment. FIG. 17D is a schematic explanatory view illustrating a fourth modification of the support structure of the motor 3 in the rotating device 1 according to the embodiment. FIG. 17E is a schematic explanatory view illustrating a fifth modification of the support structure of the motor 3 in the rotating device 1 according to the embodiment.

As illustrated in FIG. 17A, it is also possible to support the motor 3, by disposing the adhesive 4 having elasticity between the area extending over an outer peripheral side surface 30a of the frame 30 and the third outer side surface 342a of the first end part 34, and a holding wall 260 formed at the inside of a wall part 2a of the housing 2.

Alternatively, as illustrated in FIG. 17B, it is possible to support the motor 3 by disposing the adhesive 4 having elasticity at any position between the outer peripheral side surface 30a of the frame 30 and the surface facing the outer peripheral side surface 30a, that is, a bottom surface 2b being the inside surface of the wall part 2a of the housing 2 serving as the holding part. That is, in the example illustrated in FIG. 17B, the adhesive 4 is applied between the outer peripheral side surface 30a being the frame parallel surface, and the bottom surface 2b of the housing 2 (second housing 22) facing the outer peripheral side surface 30a.

In the mode of applying the adhesive 4 at the frame parallel surface, as illustrated in FIG. 17C and FIG. 17D, a step part may be provided at the outer periphery of the application area of the adhesive 4 at the surface (bottom surface 2b) of the second housing 22 facing the outer peripheral side surface 30a being the frame parallel surface. In the example illustrated in FIG. 17C, in an application area at the bottom surface 2b, a recessed part 20b recessed from the outer periphery of the application area is formed in a direction separating from the outer peripheral side surface 30a. Then, the adhesive 4 is applied so as to fill between the outer peripheral side surface 30a and the recessed part 20b, and becomes the adhesive 4 serving as the resin member having elasticity. Moreover, in the example illustrated in FIG. 17D, in an application area at the bottom surface 2b, a protruding part 21b protruding from the outer periphery of the application area is formed in a direction approaching the outer peripheral side surface 30a. Then, the adhesive 4 is applied so as to fill between the outer peripheral side surface 30a and the protruding part 21b, and becomes the resin member 4 having elasticity. The outer peripheral side surface 30a being the external surface of the frame 30 and being the frame parallel surface is the external surface of the tubular-shaped body 32, and includes a surface other than the surface facing the bottom surface 2b.

Moreover, as illustrated in FIG. 17E, it is also possible to support the motor 3, by disposing the first adhesive 4a having elasticity between the first holding wall 26 formed at the inside of the wall part 2a of the housing 2 and the third outer side surface 342a of the first end part 34 of the frame 30, and by disposing the second adhesive 4b having elasticity between the second holding wall 27 formed at the inside of the wall part 2a of the housing 2 and the fourth outer side surface 352a of the second end part 35. Furthermore, to the shape of the resin member 4 having elasticity after being cured, the shape (of an area extending over the outer peripheral side surface 30a and the third outer side surface 342a of the first end part 34, the outer peripheral side surface 30a, the third outer side surface 342a, and the fourth outer side surface 352a) of the motor 3, and the shape (of the holding wall 260, the bottom surface 2b, the first holding wall 26, and the second holding wall 27) of the second housing 22 are transferred. The resin member 4 having elasticity after being cured is an adhesive for adhering the motor 3 and the second housing 22.

In this manner, it is possible to firmly support the motor 3 and suppress the generation of abnormal noise, by disposing the adhesive 4 having elasticity between the outer side surface of the frame 30 and the surface of the holding part intersecting the axial direction of the motor 3.

Figure 18A:
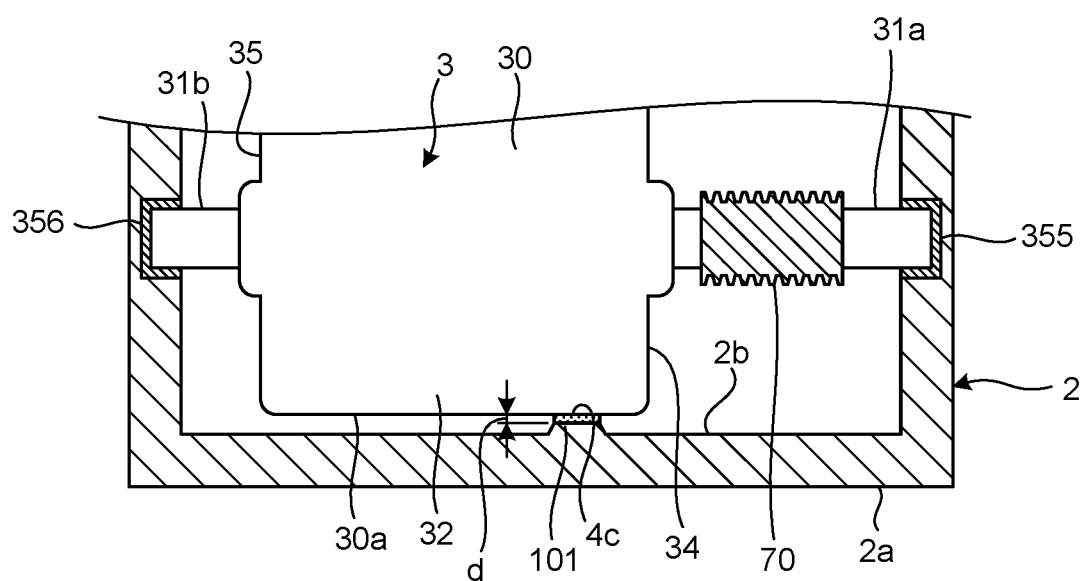
FIG. 18A is a schematic explanatory view illustrating a support structure of a motor in a rotating device according to another embodiment.

Next, a support structure of the motor 3 in the rotating device 1 according to another embodiment will be described. FIG. 18A is a schematic explanatory view illustrating a support structure of the motor 3 in the rotating device 1 according to another embodiment. As illustrated in FIG. 18A, the motor 3 of another embodiment is the type of the rotating shaft 31 of which protrudes from both sides of the frame 30. As illustrated in FIG. 18A, in the rotating shaft 31 of the motor 3 in another embodiment, a portion protruding from the first end part 34 and installed with the worm gear 70 is referred to as a first protrusion axis 31a, and a portion protruding from the second end part 35 is referred to as a second protrusion axis 31b.

The end part of the first protrusion axis 31a is supported by a first bearing 355 to be a third holding part, at the wall part 2a of the housing 2. The end part of the second protrusion axis 31b is supported by a second bearing 356 to be a fourth holding part, at the wall part 2a of the housing 2.

Accordingly, because the rotating shaft 31 of the motor 3 is supported by the wall part 2a of the housing 2 via the first bearing 355 and the second bearing 356, the movement of the motor 3 in the axial direction of the motor 3 is structurally restricted. On the other hand, in the motor 3 of such a type, when the rotating shaft 31 is rotated, the frame 30 accommodating the function unit 3a (see FIG. 16A and the like) may be rotated by the reaction force.

Consequently, in this example, as a fifth holding part for holding the tubular-shaped body 32 of the frame 30, a motor holding part 101 is formed at the wall part 2a of the housing 2, and a third adhesive 4c having elasticity is disposed between the wall part 2a of the housing 2 and the outer peripheral side surface 30a of the tubular-shaped body 32 of the frame 30. A gap d is provided between the outer peripheral side surface of the tubular-shaped body 32 and the wall part 2a of the housing 2 to be a surface of the motor holding part 101, so as enough to dispose the third adhesive 4c having elasticity. Similar to the adhesive 4a and the adhesive 4b described above, the adhesive 4c is an adhesive to be a member having elasticity after being cured. In other words, in the example illustrated in FIG. 18A, the adhesive 4c is applied between the outer peripheral side surface 30a being the frame parallel surface and the bottom surface 2b serving as the holding part. Then, in the example illustrated in FIG. 18A, in an application area at the bottom surface 2b, the holding part 101 serving as a protruding part protruding from the outer periphery of the application area at the bottom surface 2b is formed in a direction approaching the outer peripheral side surface 30a. Then, the adhesive 4c is applied so as to fill between the outer peripheral side surface 30a and the holding part 101, and becomes the resin member 4 having elasticity. Moreover, to the shape of the resin member 4 having elasticity after being cured, the shape (of the outer peripheral side surface 30a) of the motor 3, and the shape (of the bottom surface 2b) of the second housing 22 are transferred. The resin member 4 having elasticity after being cured is an adhesive for adhering the motor 3 and the second housing 22.

With such a configuration, it is possible to suppress the frame 30 of the motor 3 from turning in the housing 2, and suppress the generation of abnormal noise caused by turning.

Figure 18B:
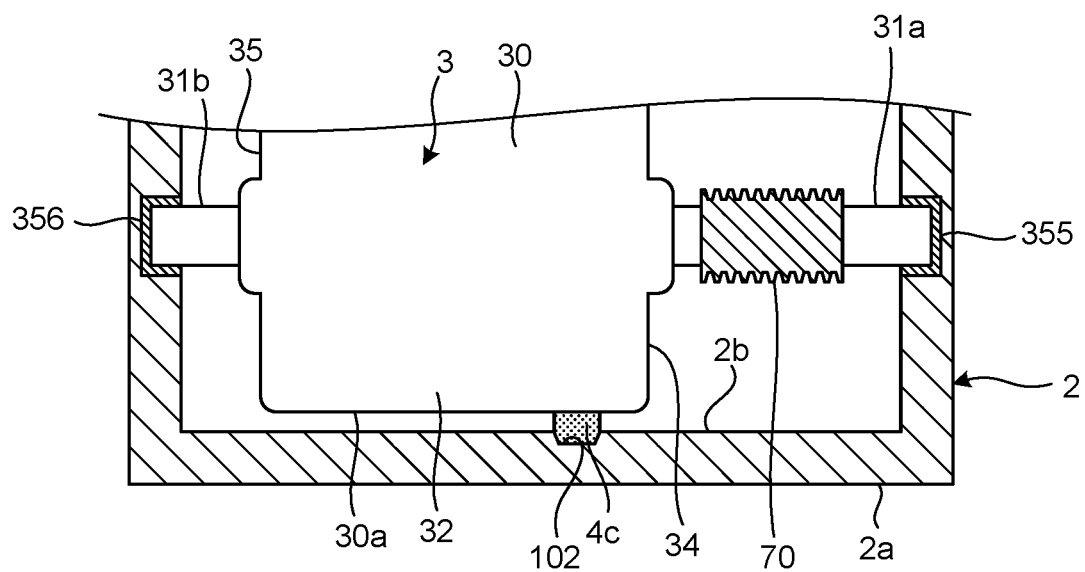
FIG. 18B is a schematic explanatory view illustrating a first modification of the support structure of the motor in the rotating device according to another embodiment.
Figure 18C:
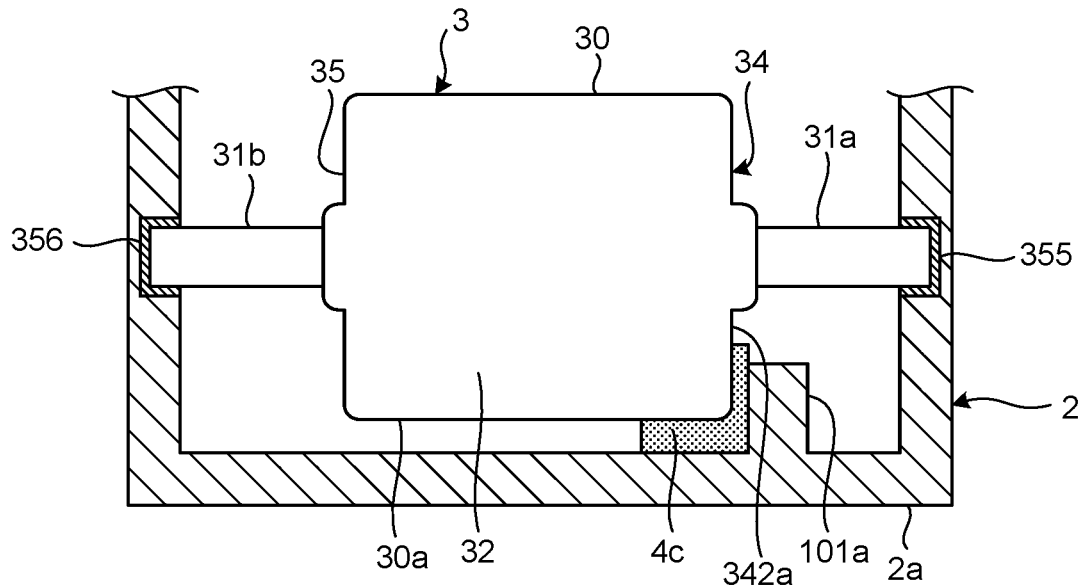
FIG. 18C is a schematic explanatory view illustrating a second modification of the support structure of the motor in the rotating device according to another embodiment.
Figure 18D:
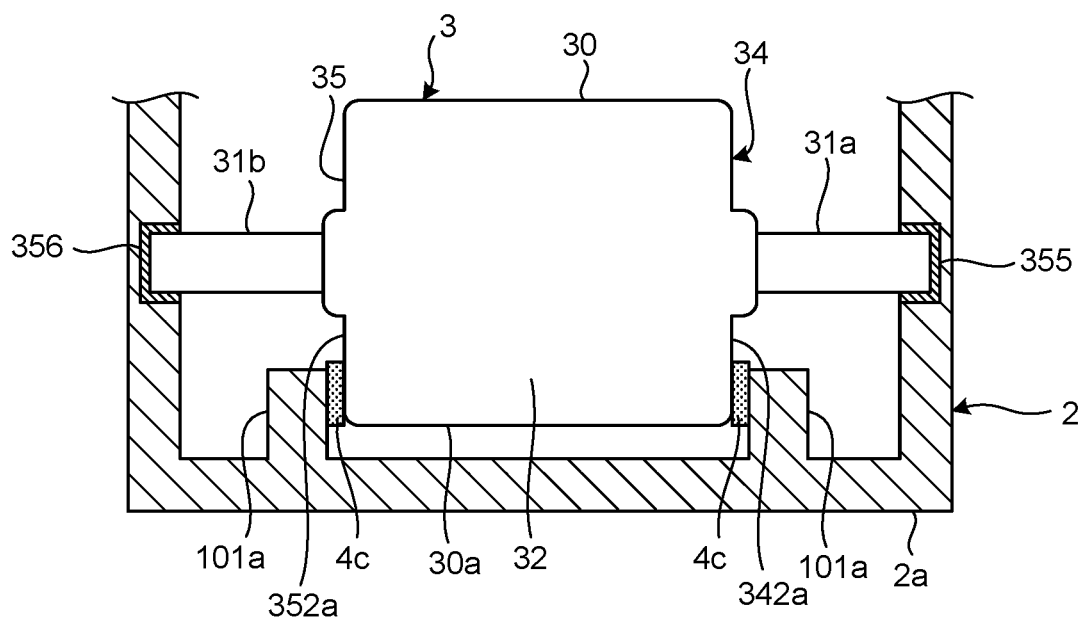
FIG. 18D is a schematic explanatory view illustrating a third modification of the support structure of the motor in the rotating device according to another embodiment.

When the motor 3 in the rotating device 1 according to another embodiment is the type of the rotating shaft 31 of which protrudes from both sides of the frame 30, the support structure of the motor 3 may also be configured as illustrated in FIG. 18B, FIG. 18C, and FIG. 18D. FIG. 18B is a schematic explanatory view illustrating a first modification of the support structure of the motor 3 in the rotating device 1 according to another embodiment. FIG. 18C is a schematic explanatory view illustrating a second modification of the support structure of the motor 3 in the rotating device 1 according to another embodiment. FIG. 18D is a schematic explanatory view illustrating a third modification of the support structure of the motor 3 in the rotating device 1 according to another embodiment.

In an example illustrated in FIG. 18B, in an application area at the bottom surface 2b, a recessed part 102 recessed from the outer periphery of the application area is formed in a direction separating from the outer peripheral side surface 30a. Then, the adhesive 4c is applied so as to fill between the outer peripheral side surface 30a and the recessed part 102, and becomes the adhesive 4 serving as the resin member having elasticity. Moreover, to the shape of the resin member 4 having elasticity after being cured, the shape (of the outer peripheral side surface 30a) of the motor 3 and the shape (of the recessed part 102) of the second housing 22 are transferred. The resin member 4 having elasticity after being cured is an adhesive for adhering the motor 3 and the second housing 22.

As illustrated in FIG. 18C, it is also possible to support the motor 3, by disposing the third adhesive 4c having elasticity between an area extending over the outer peripheral side surface 30a of the frame 30 and the third outer side surface 342a of the first end part 34, and a wall-like motor holding part 101a formed at the inside of the wall part 2a of the housing 2. Moreover, to the shape of the resin member 4 having elasticity after being cured, the shape (of an area extending over the outer peripheral side surface 30a of the frame 30 and the third outer side surface 342a of the first end part 34) of the motor 3 and the shape (of the motor holding part 101a) of the second housing 22 are transferred. The resin member 4 having elasticity after being cured is an adhesive for adhering the motor 3 and the second housing 22.

Moreover, as illustrated in FIG. 18D, it is also possible to support the motor 3, by providing the wall-like motor holding part 101a on the first end part 34 side and the second end part 35 side of the frame 30 of the motor 3, and disposing the third adhesive 4c having elasticity between one motor holding part 101a and the third outer side surface 342a of the first end part 34, and between the other motor holding part 101a and the fourth outer side surface 352a of the second end part 35. Furthermore, to the shape of the resin member 4 having elasticity after being cured, the shape (of the third outer side surface 342a and the fourth outer side surface 352a) of the motor 3, and the shape (of the one motor holding part 101a and the other motor holding part 101a) of the second housing 22 are transferred. The resin member 4 having elasticity after being cured is an adhesive for adhering the motor 3 and the second housing 22.

In this manner, even if the motor 3 is the type of the rotating shaft 31 of which protrudes from both sides of the frame 30, by disposing the adhesive 4 having elasticity between the outer side surface of the frame 30 and the surface of the holding part intersecting the axial direction of the motor 3, it is possible to support the motor 3 and suppress the generation of abnormal noise.

In the examples illustrated in FIG. 18A, FIG. 18G, and FIG. 18D, the motor holding part 101 serving as the third holding part protrudes inwardly from the wall part 2a of the housing 2. However, the size and shape of the motor holding part 101 are not limited in any way. In the wall part 2a of the housing 2, the surface adhered with the third adhesive 4c having elasticity may be the motor holding part 101.

Moreover, the third holding part illustrated in the present embodiment is also applicable to the type of the motor 3 of the rotating shaft 31 of which protrudes toward one side illustrated in the prior embodiment.

Next, the support structure of the motor 3 using the housing 2 according to another embodiment will be described. In the embodiment described above, the generation of abnormal noise is suppressed, by filling the resin member 4 having elasticity in a part of the gap formed between the second housing 22 and the motor 3, while the motor 3 (first bearing part 341 and second bearing part 351) is in direct contact with and is supported by both of the first housing 21 and the second housing 22. In this example, abnormal noise is generated in the housing 2, when the vibration of the driven motor 3 propagates to the housing 2. The generation of such abnormal noise can be suppressed by suppressing the propagation of vibration of the motor 3 to the housing 2.

Thus, in the following embodiment, to suppress the propagation of vibration of the motor 3 to the housing 2, the rotating device 1 is configured as follows. First, the motor 3 is in direct contact with and is supported by one housing out of the first housing 21 and the second housing 22. The motor 3 is not in contact with the whole of the other housing out of the first housing 21 and the second housing 22, and is supported by the other housing via the resin member 4 having elasticity. Accordingly, it is possible to suppress the propagation of the vibration of the motor 3 to the housing 2, and suppress the generation of abnormal noise.

An example of the rotating device 1 configured in this manner will be described with reference to FIG. 19 to FIG. 23. FIG. 19 to FIG. 23 are diagrams of the motor 3 using the housing 2 according to another embodiment, explaining the support structure of the motor 3. Basically, the rotating device 1 illustrated in FIG. 19 to FIG. 23 has the same configuration as the rotating device 1 described using FIG. 1 to FIG. 16C. However, the configuration of the second housing 22 serving as the other housing, a position where the resin member 4 having elasticity is arranged, and the like are different.

Figure 19:
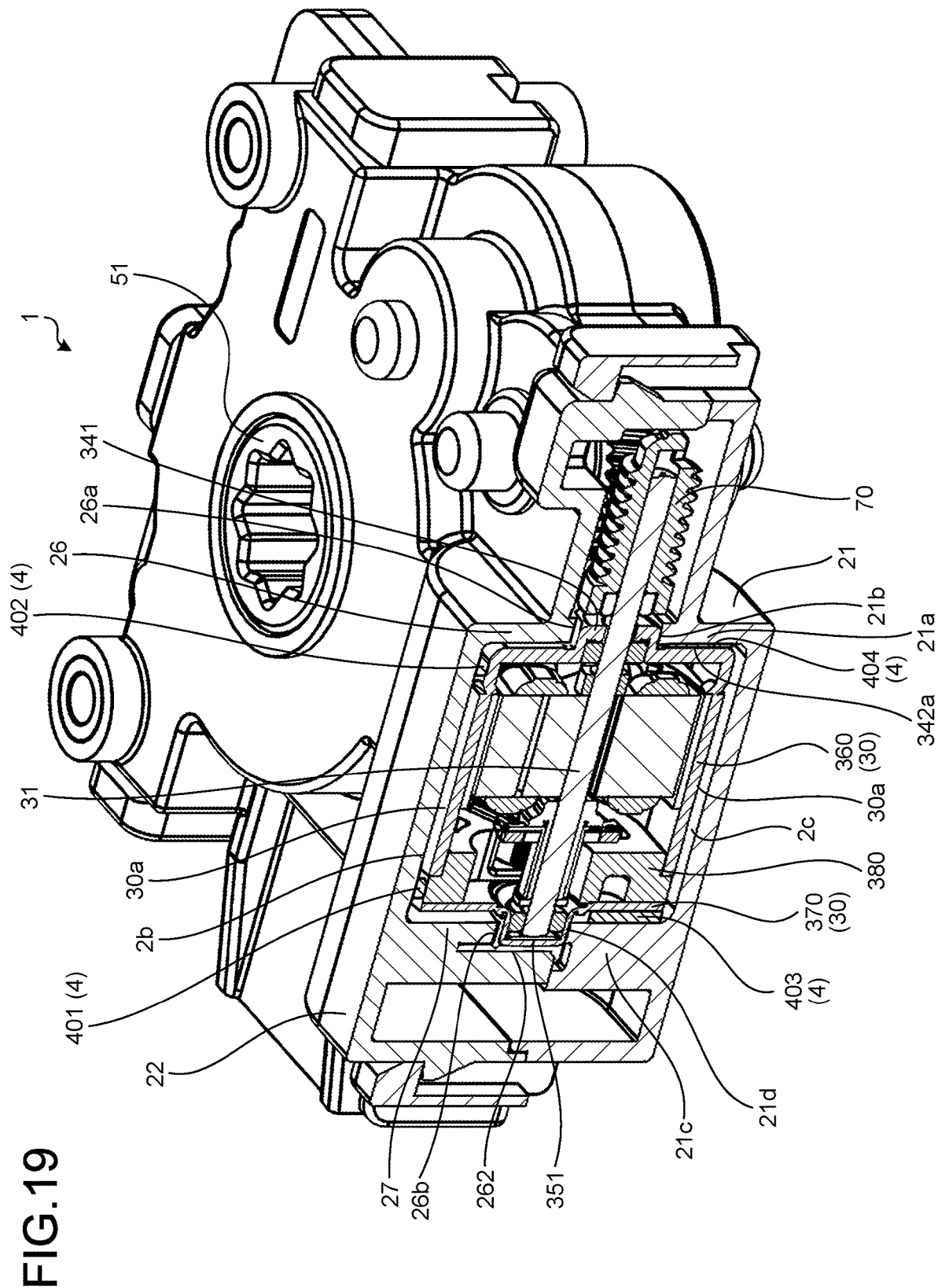
FIG. 19 is a diagram (1) for explaining the support structure of the motor using a housing according to another embodiment.

FIG. 19 is a sectional view of the rotating device 1 passing through the rotating shaft 31 of the motor 3, and cut along the rotating shaft direction of the motor 3. As illustrated in FIG. 19, the motor 3 is in direct contact with and is supported by the first housing 21 serving as one housing. Specifically, in the rotating shaft direction (also the frame vertical direction) of the output shaft 51, the first housing 21 and the frame 30 of the motor 3 are in direct contact. More specifically, the third recessed part 21b formed at the third holding wall 21a of the first housing 21 abuts and holds the first bearing part 341 of the frame 30 in the motor shaft vertical direction. Moreover, the protruding part 21d formed at the fourth holding wall 21c of the first housing 21 abuts and holds the second bearing part 351 of the frame 30 in the motor shaft vertical direction.

On the other hand, the motor 3 is not in contact with the whole of the second housing 22 serving as the other housing. For example, as illustrated in FIG. 19, the first recessed part 26a formed at the first holding wall 26 of the second housing 22 is not in contact with the first bearing part 341 of the frame 30. Moreover, as illustrated in FIG. 19, the second recessed part 26b formed at the second holding wall 27 of the second housing 22 is not in contact with the second bearing part 351 of the frame 30.

The motor 3 is supported by the second housing 22 via the resin member 4 having elasticity. In other words, in the rotating shaft direction of the output shaft 51 orthogonal to the rotating shaft direction of the rotating shaft 31, a predetermined gap is formed between the whole of the second housing 22 and the whole of the frame 30 of the motor 3 facing each other. Then, the resin member 4 having elasticity is disposed in the gap.

Figure 20:
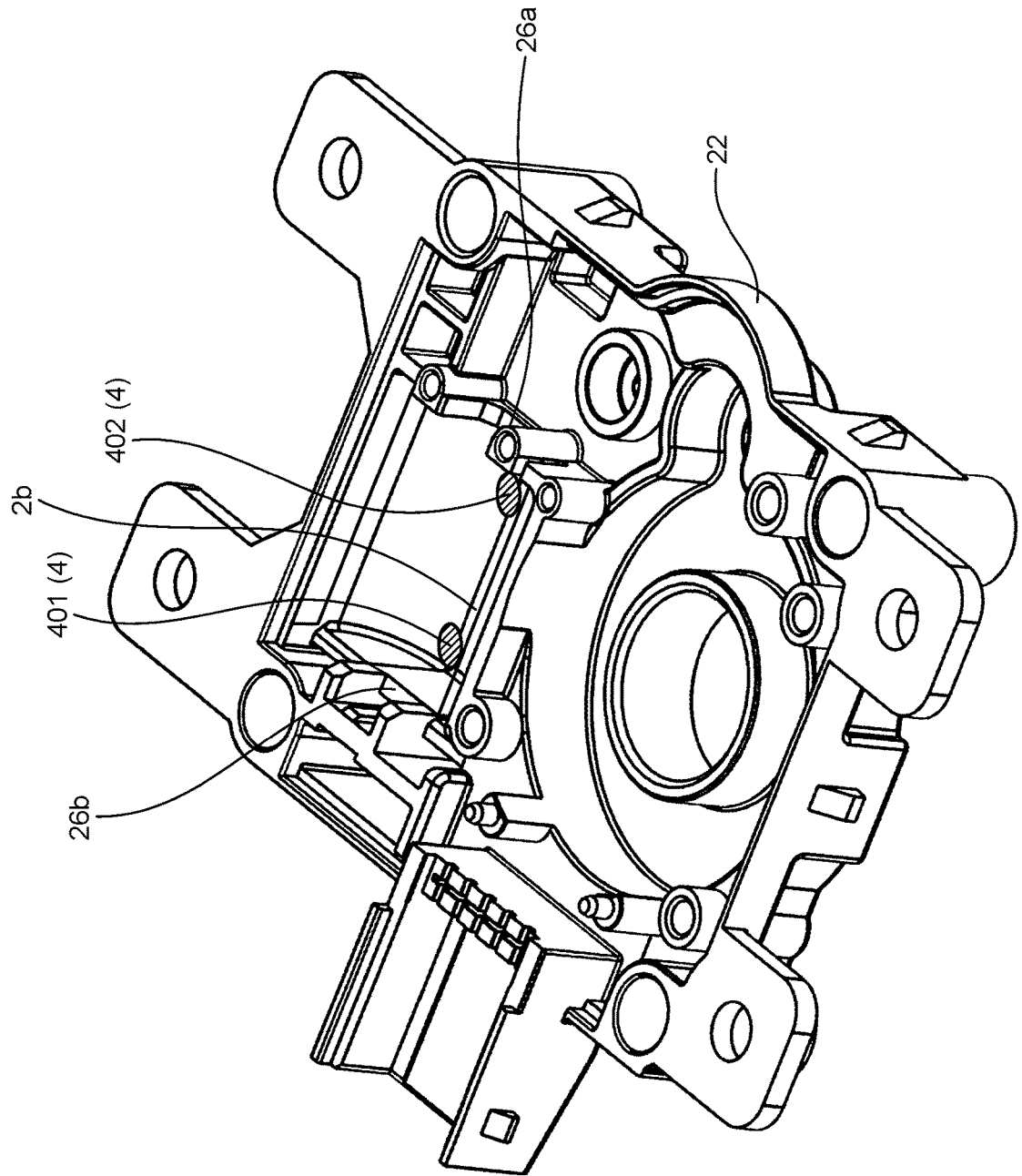
FIG. 20 is a diagram (2) for explaining the support structure of the motor using the housing according to another embodiment.

FIG. 20 is a whole perspective view of the second housing 22 illustrated in FIG. 19. For example, as illustrated in FIG. 19 and FIG. 20, an adhesive 401 and an adhesive 402 serving as the resin member 4 are disposed between the bottom surface 2b and the outer peripheral side surface 30a while being separated in the rotating shaft direction of the motor 3. The adhesive 401 is disposed on the bottom surface 2b on the first recessed part 26a side. The adhesive 402 is disposed on the bottom surface 2b on the second recessed part 26b side. The number of resin members to be disposed in the gap formed between the second housing 22 and the frame 30 in a scattering manner may be equal to or more than three. Moreover, the resin member disposed in the gap may be provided in any shape such as a linear shape in the radial direction or the rotating shaft direction of the motor 3. When the resin member is provided in a linear shape, the width (short-side direction) of the linear resin member may be the same as or smaller than the width (diameter) of the shaft of the motor 3. The width (long-side direction) of the linear resin member may be the same as or smaller than the length of the motor 3 in the rotating shaft direction.

Moreover, as described above, the first housing 21 is in direct contact with the frame 30 in the rotating shaft direction of the output shaft 51. However, in the first housing 21, a predetermined gap is formed between the first housing 21 and the frame vertical surface of the motor 3, in the rotating shaft direction of the motor 3. Furthermore, in the present embodiment, the resin member 4 having elasticity is also disposed in the gap.

Figure 21:
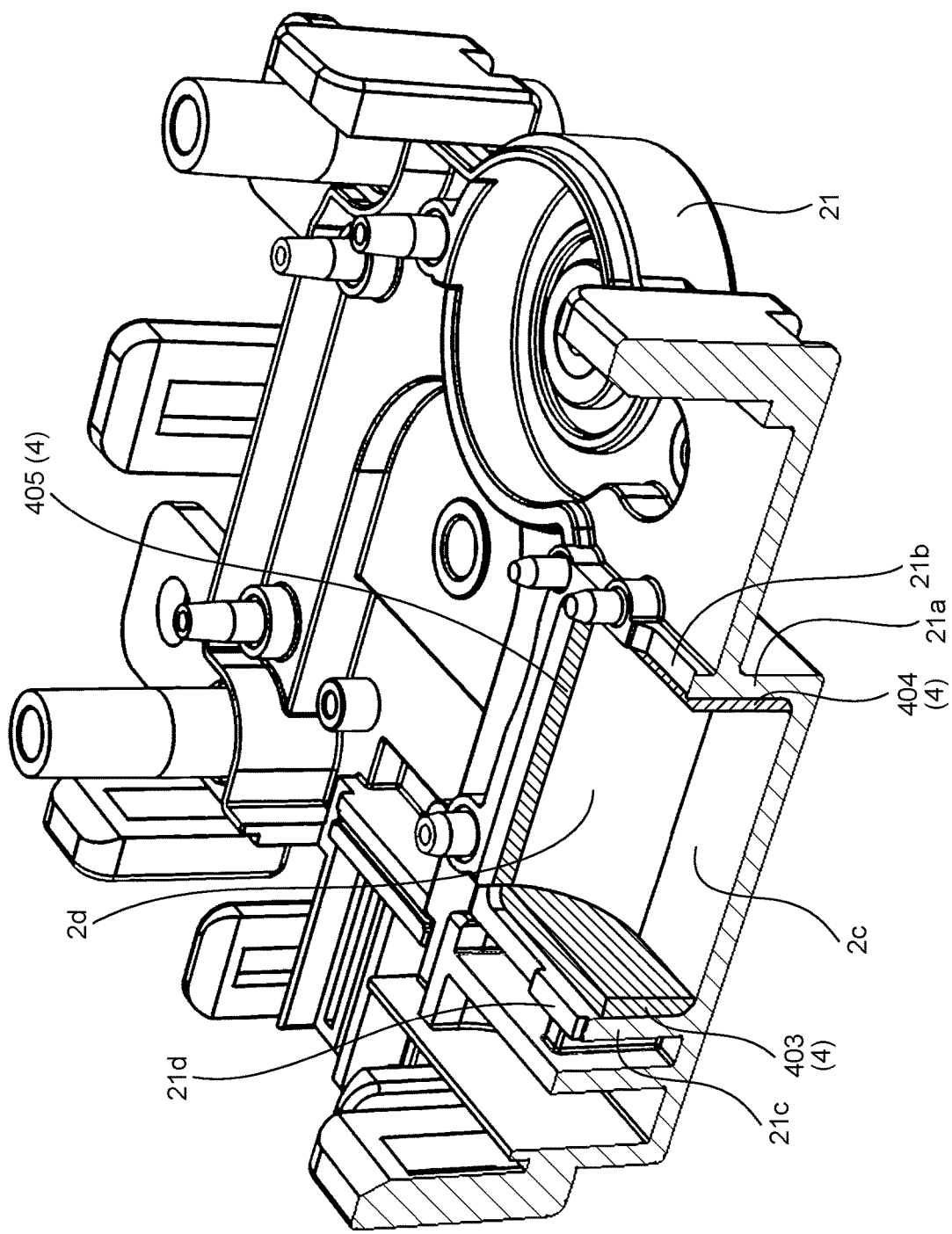
FIG. 21 is a diagram (3) for explaining the support structure of the motor using the housing according to another embodiment.

FIG. 21 is a perspective view of the first housing 21 illustrated in FIG. 19. As illustrated in FIG. 19 and FIG. 21, an adhesive 403 serving as the resin member 4 is disposed between the plate 370 and the fourth holding wall 21c so as to cover one surface of the fourth holding wall 21c. Moreover, as illustrated in FIG. 19 and FIG. 21, an adhesive 404 serving as the resin member 4 is disposed between the third outer side surface 342a and the third holding wall 21a so as to cover one surface of the third holding wall 21a. The adhesive 4040 may also be disposed so as to cover a part of the third holding wall 21a. Furthermore, the adhesive 4040 may also be disposed so as to cover a part of the fourth holding wall 21c.

Figure 22:
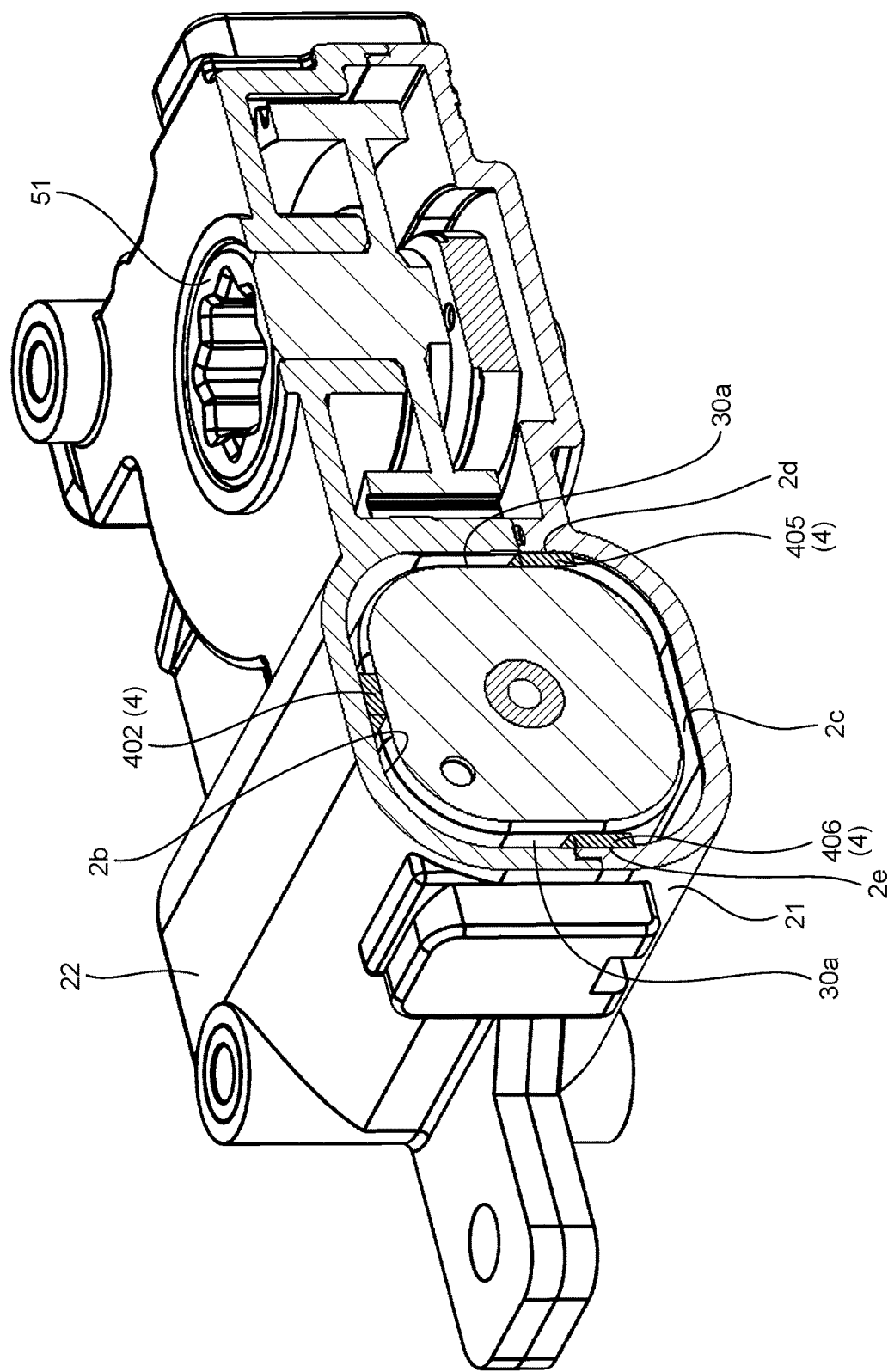
FIG. 22 is a diagram (4) for explaining the support structure of the motor using the housing according to another embodiment.

Still furthermore, in a direction orthogonal to the rotating shaft direction of the motor 3 and a direction orthogonal to the rotating shaft direction of the output shaft 51, a predetermined gap is formed between the first housing 21 and the outer peripheral side surface 30a of the motor 3. The resin member 4 having elasticity is disposed in this gap. In other words, the first housing 21 is in direct contact with the first bearing part 341 and the second bearing part 351 to support the motor 3, but is not in contact with the motor 3 at other locations. FIG. 22 is a sectional view of the rotating device 1 of a section passing through the adhesive 402, orthogonal to the section illustrated in FIG. 19, and orthogonal to the rotating shaft direction of the motor 3. Moreover, FIG. 22 is a sectional view of the rotating device 1 of a section passing through the adhesive 401, orthogonal to the section in FIG. 19, and orthogonal to the rotating shaft direction of the motor 3.

Figure 23:
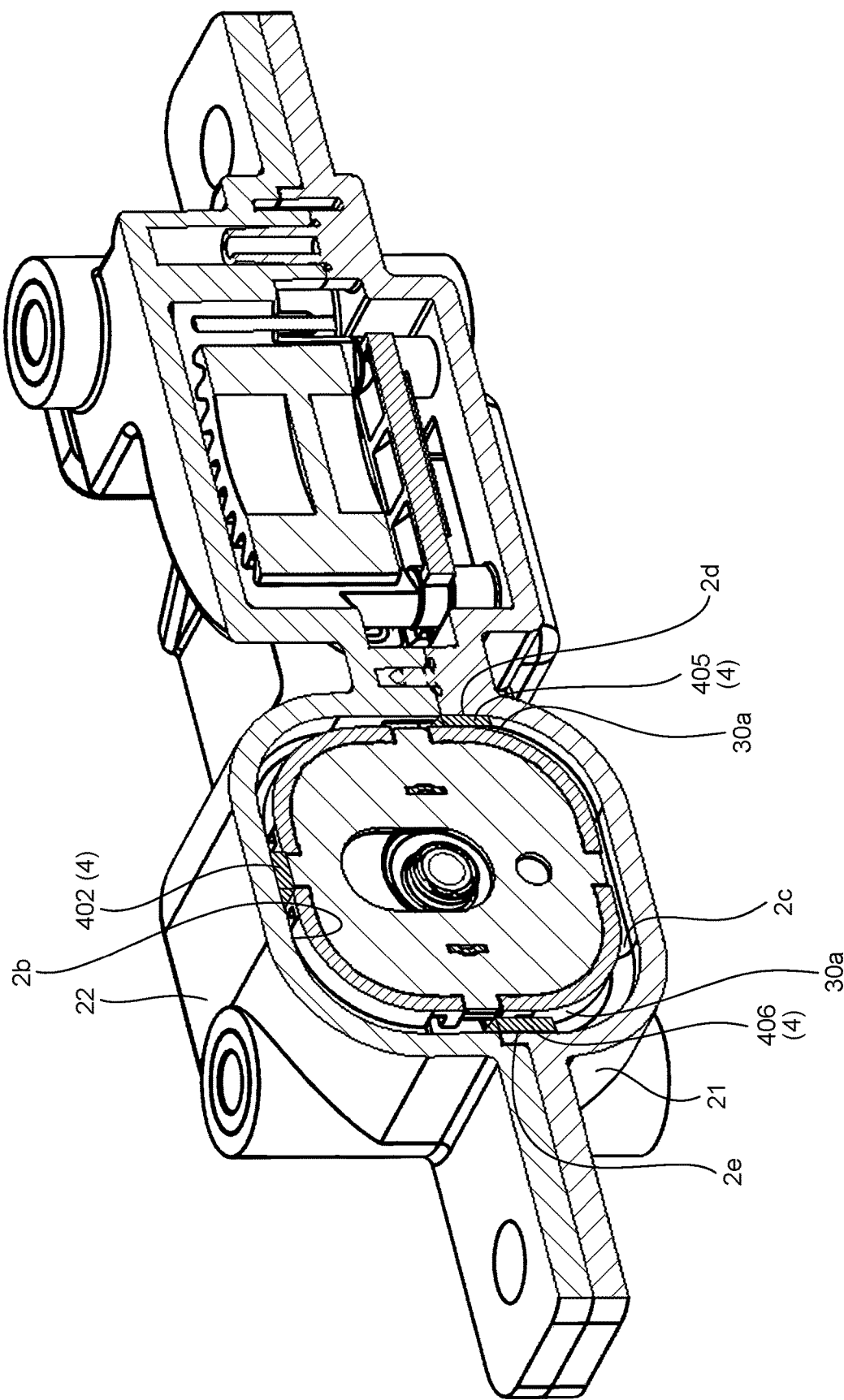
FIG. 23 is a diagram (5) for explaining the support structure of the motor using the housing according to another embodiment.

As illustrated in FIG. 21, FIG. 22, and FIG. 23, as a surface surrounding the motor 3, the first housing 21 includes a bottom surface 2c, a side surface 2d standing upright toward the second housing 22 from the end part at the output shaft 51 side of the bottom surface 2c, and a side surface 2e standing upright toward the second housing 22 from the end part on the side opposite to the output shaft 51 side of the bottom surface 2c. For example, as illustrated in FIG. 21, FIG. 22, and FIG. 23, an adhesive 405 being the resin member 4 is linearly disposed between the side surface 2d and the outer peripheral side surface 30a, along the rotating shaft direction of the motor 3. Moreover, as illustrated in FIG. 22 and FIG. 23, an adhesive 406 being the resin member 4 is linearly disposed between the side surface 2d and the outer peripheral side surface 30a, along the rotating shaft direction of the motor 3. The adhesive 405 and the adhesive 406 being the resin member 4 may also be disposed along the rotating shaft direction of the motor 3 in a scattering manner.

In the present embodiment also, as described above, the resin member 4 is a member obtained when a liquid adhesive is cured, and the liquid adhesive is an adhesive to be a member having elasticity after being cured. As described above, the resin member 4 includes a shape that a shape of the motor 3 and the shape of the housing 2 serving as the holding part are transferred, and the resin member 4 having elasticity becomes an adhesive for adhering the motor 3 and the housing 2.

In this manner, the first bearing part 341 and the second bearing part 351 being the main generation source of the vibration of the driven motor 3 are in direct contact with and are supported by a part of the first housing 21 being one of the housings. Alternatively, the whole of the motor 3 including the first bearing part 341 and the second bearing part 351 is not in contact with the whole of the second housing 22 being the other housing, and is supported via the resin member 4 having elasticity. As a result, the holding function of the motor 3 is obtained with the first housing 21 and moving of the motor 3 is suppressed, and the resin member 4 disposed between the motor 3 and the second housing 22 can absorb the vibration of the motor 3 and suppress the propagation of the vibration to the housing 2. Accordingly, it is possible to suppress the generation of abnormal noise.

Moreover, at most part of the first bearing part 341 and the second bearing part 351 except the portion in contact with the first housing 21, the motor 3 is not in contact with the first housing 21. The resin member 4 having elasticity is also disposed between the portion of the first housing 21 that is not in contact with the motor 3, and the motor 3. Accordingly, it is possible to further suppress the propagation of the vibration of the motor 3 to the housing 2. In the present embodiment, the resin member 4 may not be disposed between the first housing 21 and the motor 3. Moreover, in the present embodiment, one housing may be the second housing 22, and the other housing may be the first housing 21.

Furthermore, in the present embodiment, the motor 3 may not be in contact with both the whole of the first housing 21 and the whole of the second housing 22, and the motor 3 may be supported by both the first housing 21 and the second housing 22 via the resin member 4 having elasticity. According to such a structure, it is also possible to suppress the generation of abnormal noise.

Still furthermore, the mode described in the present embodiment is also applicable to the motor 3 of the type of the rotating shaft 31 of which protrudes from both sides illustrated in the prior embodiment.

According to the embodiment described above, the following rotating device 1 can be implemented.

(1) The rotating device 1 including the housing 2 having the first housing 21 and the second housing 22 opposing each other; the motor 3 accommodated in the housing 2; and the output gear 5 for transmitting the rotation of the motor 3 to the external device, wherein in the first housing 21, the cylinder-shaped protrusion part 28 having the first through hole 281 is formed, and in the second housing 22, the second through hole 282 for fitting the protrusion part 28 is provided.

According to the rotating device 1 having such a configuration, even if warpage occurs in the first housing 21 and the second housing 22 during molding, it is possible to correct the warpage in the first housing 21 and the second housing 22, when the first housing 21 and the second housing 22 are assembled and the protrusion part 28 is fitted into the second through hole 282. Accordingly, because the dimensional accuracy of the housing 2 is improved, and the accommodated motor 3 and the gear group 6 including the output gear 5 accurately mesh with each other, it is possible to suppress the generation of abnormal noise.

(2) The rotating device 1 according to the above description (1), wherein the outer diameter of the cylinder-shaped protrusion part 28 is larger than the bore diameter of the second through hole 282.

With such a configuration, the protrusion part 28 can be firmly press-fitted into the second through hole 282, and the correction of the warpage in the above description (1) can be further improved.

(3) The rotating device 1 according to the above description (1) or (2), wherein the protrusion part 28 is provided at the corner of the outer peripheral part of the first housing 21, and the second through hole 282 is provided at the corner of the second housing 22.

With such a configuration, it is possible to improve the ability of correcting the warpage described in the above description (2), and improve the ability of suppressing the generation of abnormal noise.

(4) The rotating device 1 according to any one of the above descriptions (1) to (3), wherein a plurality of the protrusion parts 28 are provided, a plurality of the second through holes 282 are provided, the plurality of protrusion parts 28 are provided at a plurality of respective corners of the first housing 21, and the plurality of second through holes 282 are provided at a plurality of respective corners of the second housing 22.

With such a configuration, it is possible to improve the ability of correcting the warpage described in any one of the above descriptions (1) to (3), and improve the ability of suppressing the generation of abnormal noise.

(5) The rotating device 1 according to any one of the above descriptions (1) to (4), wherein the first housing 21 and the second housing 22 include the first contact surface 271 and the second contact surface 272 coming into contact with each other, respectively, the first housing 21 includes the first surface part 210 to be the top surface part of the housing 2, the protrusion part 28 protrudes from the first contact surface 271, the second housing 22 includes the second surface part 220 to be the bottom surface part of the housing 2, and the second through hole 282 extends from the second contact surface 272 to the second surface part 220.

With such a configuration, it is possible to configure the housing 2 in a desirable shape, by the first housing 21 and the second housing 22, while correcting the warpage described in any one of the above descriptions (1) to (4).

(6) The rotating device 1 according to the above description (5), wherein the first surface part 210 and the second surface part 220 each include a plurality of corners, and the protrusion part 28 and the second through hole 282 are formed at the plurality of corners.

With such a configuration, it is possible to easily form the first housing 21 and the second housing 22 having sufficient rigidity by resin molding, while allowing the correction of the warpage described in the above description (5).

(7) The rotating device 1 according to the above description (6), wherein the second housing 22 includes the second side wall part 222 provided at the outer periphery of the second surface part 220, and the second through hole 282 is formed at the thick part 29 formed at the corner of the second side wall part 222.

With such a configuration, it is possible to form the second housing 22 having sufficient rigidity, regardless of the bore diameter of the second through hole 282.

(8) The rotating device 1 according to any one of the above descriptions (5) to (7), wherein the protrusion length L1 of the protrusion part 28 and the thickness H of the housing 2 in a region provided with the protrusion part 28 satisfy the relation of $0.3*H \le L1 \le 0.8\ H$.

With such a configuration, it is possible to further improve the ability of suppressing the generation of abnormal noise, regardless of the thickness of the housing.

(9) The rotating device 1 according to any one of the above descriptions (5) to (8), wherein the protrusion length L1 of the protrusion part 28 and the total length L2 of the second through hole 282 satisfy the relation of L1 L2.

With such a configuration, when fastening via a fastening tool, the fastening force of the fastening tool ensures that the first contact surface and the second contact surface are in contact with each other, and the first housing and the second housing can be assembled more securely.

(10) The rotating device 1 according to any one of the above descriptions (5) to (9), wherein the protrusion length L1 of the protrusion part 28 and the total length L2 of the second through hole 282 satisfy the relation of $0.3 \le L1/L2 \le 1.0$.

With such a configuration, it is possible to form the first housing 21 and the second housing 22 having sufficient rigidity more securely, while allowing the correction of the warpage as described in the above descriptions (5) to (9).

(11) The rotating device 1 according to any one of the above descriptions (5) to (10), wherein on the first contact surface 271, the annular groove part 23 surrounding the protrusion part 28 is formed.

With such a configuration, it is possible to form the first housing 21 and the second housing 22 having sufficient rigidity more securely, while allowing the correction of the warpage as described in the above descriptions (5) to (10), and easily fit the protrusion part 28 into the second through hole 282.

(12) The rotating device 1 according to any one of the above descriptions (1) to (11), capable of being mounted on a predetermined mounting surface (for example, the sheet metal 200 and the plate body 202) via the fastening tool 60 to be inserted into the first through hole 281.

With such a configuration, it is possible to easily mount the rotating device 1 on a desirable position according to the use.

(13) The rotating device 1 including the motor 3, the output gear 5 for transmitting the rotation of the motor 3 to the external device, and the housing 2 for accommodating the motor 3 and the output gear 5, wherein the motor 3 is held by the holding part (first holding wall 26 and second holding wall 27) formed in the housing 2 via the adhesive 4 having elasticity.

According to the rotating device 1 having such a configuration, it is possible to suppress the generation of abnormal noise while suppressing the increase in cost.

(14) The rotating device 1 according to the above description (13), wherein the motor 3 includes the frame 30 and the rotating shaft 31 connected to the output gear 5, the frame 30 includes the tubular-shaped body 32 and the third outer side surface 342a forming the first end part 34 in the axial direction of the motor 3, the first holding wall 26 includes the surface 261 intersecting the axial direction of the motor 3, and the adhesive 4 having elasticity is disposed between the surface 261 of the first holding wall 26 intersecting the axial direction of the motor 3 and the third outer side surface 342a of the frame 30.

With such a configuration, it is possible to suppress the motor 3 from moving in the axial direction, and suppress the generation of abnormal noise more securely, while suppressing the increase in cost.

(15) The rotating device 1 according to the above description (14), wherein the adhesive 4 having elasticity is disposed between the surface 262 of the second holding wall 27 intersecting the axial direction of the motor 3 and the second end part 35 of the frame 30.

With such a configuration also, it is possible to suppress the motor 3 from moving in the axial direction, and suppress the generation of abnormal noise more securely, while suppressing the increase in cost.

(16) The rotating device 1 according to the above description (14) or (15), wherein the frame 30, when the end part in the axial direction of the motor 3 is the first end part 34, and when the outer side surface forming the first end part 34 is the first outer side surface, includes the second outer side surface forming the second end part 35, and when the holding part is the first holding wall 26, includes the second holding wall 27; the second holding wall 27, when the surface intersecting the axial direction of the motor 3 is the surface intersecting the axial direction of the motor 3 on the first outer side surface side of the frame 30, includes the surface intersecting the axial direction of the motor 3 on the second outer side surface side, and when the adhesive 4 having elasticity is the first adhesive 4a having elasticity, includes the second adhesive 4b having elasticity; and the second adhesive 4b having elasticity is disposed between the second outer side surface side and the surface intersecting the axial direction of the motor 3 on the second outer side surface side. In other words, in the rotating device 1, the frame 30 includes the first outer side surface forming the first end part 34 serving as the end part in the axial direction of the motor 3, and the second outer side surface forming the second end part 35 at the side opposite to the first outer side surface forming the first end part 34; the holding part (first holding wall 26 and second holding part 27) includes the first holding surface 261 intersecting the axial direction of the motor 3 on the first outer side surface side and the second holding surface 262 intersecting the axial direction of the motor 3 on the second outer side surface side, as the surface intersecting the axial direction of the motor 3; and the first adhesive 4a having elasticity is disposed between the first outer side surface and the first holding surface 261 intersecting the axial direction of the motor 3 on the first outer side surface side, and the second adhesive 4b having elasticity is disposed between the second outer side surface and the second holding surface 262 intersecting the axial direction of the motor 3 on the second outer side surface side.

With such a configuration, it is possible to further suppress the generation of abnormal noise in the above description (14) or (15).

(17) The rotating device 1 according to the above description (16), wherein the motor 3 includes the first bearing part 341 and the second bearing part 351; the first bearing part 341 includes the bearing 341a and the end part of the frame 30 as the first end part 34; the second bearing part 351 includes the bearing 351a and the second end part 35 of the frame 30; the first end part 34 and the second end part 35 include the outer side surfaces 342a and 352a intersecting the axial direction of the motor 3, respectively; in the housing 2, the first holding wall 26 for holding the first bearing part 341 and the second holding wall 27 for holding the second bearing part 351 are provided; the first adhesive 4a having elasticity is disposed between the first holding surface 261 intersecting the axial direction of the motor 3 in the first holding wall 26 and the third outer side surface 342a of the first end part 34; and the second adhesive 4b having elasticity is disposed between the second holding surface 262 intersecting the axial direction of the motor 3 in the second holding wall 27 and the second bearing part 351 of the second end part 35.

With such a configuration, the rotating device 1 can be suitably used for the motor 3 of the type of the rotating shaft 31 of which protrudes in one direction of the frame 30, and it is possible to suppress the generation of abnormal noise while suppressing the increase in cost.

(18) The rotating device 1 according to the above description (16), wherein in the housing (2), the motor holding part 101 holding the tubular-shaped body 32 of the frame 30 is provided, and the adhesive 4 having elasticity is disposed between the tubular-shaped body 32 and the motor holding part 101 holding the tubular-shaped body 32 of the frame 30.

With such a configuration, the rotating device 1 can be suitably used for the motor 3 of the type of the rotating shaft 31 of which protrudes in both directions of the frame 30, and it is possible to suppress the generation of abnormal noise while suppressing the increase in cost.

(19) The rotating device 1 according to any one of the above descriptions (16) to (18), wherein the gap d in which the adhesive 4 having elasticity is disposed is provided between the outer peripheral side surface of the tubular-shaped body 32 and the wall part 2a to be the holding surface of the motor holding part 101 facing the outer peripheral side surface of the tubular-shaped body 32.

With such a configuration, it is possible to dispose the adhesive 4 having elasticity between the motor 3 and the wall part 2a to be the holding surface more securely.

(20) The rotating device 1 according to the above description (16), wherein the rotating shaft 31 protrudes from each of the first end part 34 and the second end part 35; in the housing 2, the first bearing 355 and the second bearing 356 holding both end parts of the rotating shaft 31, and the motor holding part 101 holding the tubular-shaped body 32 of the frame 30 are provided; and the third adhesive 4c having elasticity is disposed between the tubular-shaped body 32 of the frame 30 and the motor holding part 101.

With such a configuration, with respect to the motor 3 of the type of the rotating shaft 31 of which protrudes in both directions of the frame 30, it is possible to exhibit the effect of the above description (16), that is, to sufficiently suppress the generation of abnormal noise.

(21) The rotating device 1 according to the above description (16), wherein the rotating shaft 31 protrudes from each of the first end part 34 and the second end part 35; in the housing 2, the first bearing 355 and the second bearing 356 holding both end parts of the rotating shaft 31, and one motor holding part 101a and the other motor holding part 101a holding the tubular-shaped body 32 of the frame 30 are provided; and the third adhesive 4c having elasticity is disposed between the first outer side surface of the frame 30 and the one motor holding part 101a, and between the second outer side surface and the other motor holding part 101a.

With such a configuration also, with respect to the motor 3 of the type of the rotating shaft 31 of which protrudes in both directions of the frame 30, it is possible to exhibit the effect of the above description (16), that is, to sufficiently suppress the generation of abnormal noise.

(22) The rotating device 1 according to any one of the above descriptions (13) to (21), wherein the adhesive 4 having elasticity is at least one of a rubber-based resin member, a silicone-based resin member, a modified silicone-based resin member, a urethane-based resin member, or an epoxy-based resin member.

With such a configuration, it is possible to suppress the generation of abnormal noise, while easily suppressing the increase in cost without using a special material.

(23) The rotating device 1 according to any one of the above descriptions (13) to (22), wherein the resin member 4 having elasticity includes a shape that a shape of the motor 3 and a shape of the holding part are transferred, and the resin member 4 having elasticity is an adhesive adhering the motor 3 and the holding part.

According to such a configuration, the adhesive is formed according to the shape of an object to be adhered. Thus, it is possible to adhere the motor 3 and the holding part securely via the resin member 4 having elasticity, and suppress the generation of abnormal noise more securely.

(24) The rotating device 1 according to any one of the above descriptions (13) to (23), wherein the resin member 4 having elasticity is a cured member of the liquid adhesive 4 applied between the motor 3 and the holding part, and the liquid adhesive 4 is an adhesive to be a member having elasticity after being cured.

According to such a configuration, instead of disposing a molded part such as an O-ring molded with a mold in a gap as a cushion, the resin member 4 having a shape according to the shape of the gap can be formed and used as a cushion. Hence, it is possible to suppress the generation of abnormal noise securely and easily.

(25) The rotating device 1 according to the above description (13), wherein the housing 2 includes the first housing 21 and the second housing 22, the motor 3 is in direct contact with and is supported by one housing out of the first housing 21 and the second housing 22, the motor 3 is not in contact with the whole of the other housing out of the first housing 21 and the second housing 22, and the motor 3 is supported by the other housing via the resin member 4 having elasticity.

According to such a configuration, it is possible to suppress the propagation of the vibration of the motor 3 to the housing 2, and suppress the generation of abnormal noise.

(26) The rotating device 1 including the motor 3; the gear 6; and the housing 2 accommodating the motor 3 and the gear 6, wherein the housing 2 includes the first housing 21 and the second housing 22, the motor 3 is in direct contact with and is supported by one housing out of the first housing 21 and the second housing 22, the motor 3 is not in contact with the whole of the other housing out of the first housing 21 and the second housing 22, and the motor 3 is supported by the other housing via the resin member 4 having elasticity.

According to such a configuration, it is possible to suppress the propagation of the vibration of the motor 3 to the housing 2, and suppress the generation of abnormal noise.

Although the present invention has been described above based on the embodiments, the present invention is not limited to the embodiments, and can naturally be variously changed within the scope not deviating from the gist of the present invention. Such various changes within the scope not deviating from the gist are also included in the technical scope of the present invention, and apparent to those skilled in the art from the description of the claims.

REFERENCE SIGNS LIST 1 rotating device
2 housing
2a wall part
3 motor
3a function unit
4 adhesive having elasticity
4a first adhesive having elasticity
4b second adhesive having elasticity
5 output gear
6 gear group
7 sensor
21 first housing
22 second housing
23 annular groove part
26 first holding wall
26a first recessed part
26b second recessed part
27 second holding wall
27a inclined surface
28 protrusion part
28a base
29 thick part
30 frame
31 rotating shaft
31a first protrusion axis
31b second protrusion axis
32 tubular-shaped body
34 first end part
35 second end part
40 terminal group
51 output shaft
60 fastening tool
61 first transmission gear
61a helical gear
61b small diameter gear 62 second transmission gear
70 worm gear
91 projection part
92 fitting hole
93 joining piece
94 connection hole
101 motor holding part
200 sheet metal
201 fastening hole
202 plate body
203 hole part
210 first surface part
211 first side wall part
212 engagement part
214 opening part
215 engagement recessed part
220 second surface part
222 second side wall part
224 engagement projection
226 opening part
228 motor arrangement part
261 first holding surface
262 second holding surface
271 first contact surface
272 second contact surface
281 first through hole
281a female screw part
282 second through hole
283 tip end
284 end
301, 302 gap
341 first bearing part
342 first side part
342a third outer side surface
351 second bearing part
352 second side part
352a fourth outer side surface
353 outer surface
356 second bearing
d gap
D aperture

The invention claimed is:

1. A rotating device, comprising:
a motor including a frame and a rotating shaft;
a worm gear connected to the rotating shaft;
a gear meshing the worm gear; and
a housing accommodating the motor and the gear, wherein
the motor is held by a first holding part formed in the housing via a first resin member having elasticity,
the first resin member is an adhesive adhering the motor to the first holding part,
the frame includes a tubular-shaped body, a first end part in the worm gear side in an axial direction and a first outer side surface forming the first end part,
the first holding part includes a surface intersecting the axial direction,
a gap is formed between the first outer side surface and the surface of the first holding part in the axial direction, the surface of the first holding part opposing the first outer side surface,
the first resin member is disposed at a part of the gap, the first resin member including a shape according to the shape of the gap, the resin member being a non-mold member, and
a shape of the frame and a shape of the first holding part is transferred to the shape of the first resin member.

2. The rotating device according to claim 1, wherein the first resin member is disposed between the surface of the first holding part intersecting the axial direction and the first end part of the frame.

3. The rotating device according to claim 2, comprising
a second holding part, and
a second resin member having elasticity; wherein
the frame includes a second outer side surface forming a second end part, and
the second holding part includes a surface intersecting the axial direction on the second outer side surface side, the surface intersecting the axial direction being as the surface intersecting the axial direction on the second outer side surface side of the frame, and
the second resin member is disposed between the second outer side surface and the surface intersecting the axial direction on the second outer side surface side.

4. The rotating device according to claim 2, comprising the first outer side surface extends in a direction intersecting an outer peripheral side surface of the tubular-shaped body.

5. The rotating device according to claim 1, comprising
a second holding part, and
a second resin member having elasticity; wherein
the frame includes a second outer side surface forming a second end part, and
the second holding part includes a surface intersecting the axial direction on the second outer side surface side, the surface intersecting the axial direction being as the surface intersecting the axial direction on a second outer side surface side of the frame, and
the second resin member is disposed between the second outer side surface and the surface of the second holding part.

6. The rotating device according to claim 5, wherein
the motor includes a first bearing part and a second bearing part,
the first bearing part includes a first bearing and the first end part of the frame,
the second bearing part includes a second bearing and the second end part of the frame,
the first end part includes the first outer side surface intersecting the axial direction,
the second end part includes the second outer side surface intersecting the axial direction,
in the housing, the first holding part holding the first bearing part and the second holding part holding the second bearing part are provided, and
the first resin member is disposed between a surface of the first holding part and the first outer side surface of the first end part, and
the second resin member is disposed between a surface of the second holding part and the second bearing part.

7. The rotating device according to claim 5, wherein
in the housing, a holding part holding the tubular-shaped body of the frame is provided, and
the first resin member is disposed between the tubular-shaped body and the holding part holding the tubular-shaped body.

8. The rotating device according to claim 5, wherein
the rotating shaft protrudes from each of the first end part and the second end part,
in the housing, a third holding part and a fourth holding part holding both first and second end parts of the rotating shaft, and a fifth holding part holding the tubular-shaped body of the frame are provided, and a third resin member having elasticity is disposed between the tubular-shaped body of the frame and the fifth holding part.

9. The rotating device according to claim 5, wherein
the rotating shaft protrudes from each of the first end part and the second end part,
in the housing, a third holding part and a fourth holding part holding both first and second end parts of the rotating shaft, and a fifth holding part and a sixth holding part holding the tubular-shaped body of the frame are provided, and
a third resin member having elasticity is disposed between the first outer side surface of the frame and the fifth holding part, and between the second outer side surface and the sixth holding part.

10. The rotating device according to claim 5, comprising the second outer side surface extends in a direction intersecting an outer peripheral side surface of the tubular-shaped body.

11. The rotating device according to claim 5, wherein
the second resin member is disposed at the gap, the second resin member including a shape according to the shape of the gap,
a shape of the frame and a shape of the second holding part is transferred to the shape of the second resin member.

12. The rotating device according to claim 1, wherein the first resin member is one of a rubber-based resin member, a silicone-based resin member, a modified silicone-based resin member, a urethane-based resin member, or an epoxy-based resin member.

13. The rotating device according to claim 1, wherein
the first resin member is a cured member of a liquid adhesive applied between the motor and the first holding part, and
the first liquid adhesive is an adhesive to be a member having elasticity after being cured.

14. The rotating device according to claim 1, wherein
the housing includes a first housing and a second housing,
the motor is in direct contact with and is supported by one housing out of the first housing and the second housing,
the motor is not in contact with whole of another housing out of the first housing and the second housing, and
the motor is supported by the other housing via the first resin member.

15. The rotating device according to claim 1, wherein the first resin member is disposed at a recessed part of the surface of the first holding part.

* * * * *